US011710253B2

(12) United States Patent
Tazoe et al.

(10) Patent No.: US 11,710,253 B2
(45) Date of Patent: Jul. 25, 2023

(54) POSITION AND ATTITUDE ESTIMATION DEVICE, POSITION AND ATTITUDE ESTIMATION METHOD, AND STORAGE MEDIUM

(71) Applicant: KABUSHIKI KAISHA TOSHIBA, Tokyo (JP)

(72) Inventors: Yusuke Tazoe, Chofu Tokyo (JP); Tomoya Tsuruyama, Kawasaki Kanagawa (JP); Akihito Seki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 17/193,736

(22) Filed: Mar. 5, 2021

(65) Prior Publication Data
US 2022/0067961 A1  Mar. 3, 2022

(30) Foreign Application Priority Data
Aug. 28, 2020 (JP) ................................ 2020-144877

(51) Int. Cl.
*G06T 7/73* (2017.01)
*B64C 39/02* (2023.01)
*B64U 101/30* (2023.01)

(52) U.S. Cl.
CPC .............. *G06T 7/74* (2017.01); *B64C 39/024* (2013.01); *B64U 2101/30* (2023.01); *G06T 2207/10016* (2013.01); *G06T 2207/10032* (2013.01)

(58) Field of Classification Search
CPC ............ G06T 7/74; G06T 2207/10016; G06T 2207/10032; B64C 39/024; B64C 2201/123; B64C 2201/127; G01S 19/40
See application file for complete search history.

(56) References Cited

U.S. PATENT DOCUMENTS 10,242,281 B2 * 3/2019 Getz .................. G01S 19/19
11,024,088 B2 * 6/2021 Heinen ................ G06T 15/04
(Continued)

FOREIGN PATENT DOCUMENTS

CN    112150529 A  * 12/2020
JP   2019-11971 A    1/2019
(Continued)

OTHER PUBLICATIONS

A. Atapour-Abaighouei et al., "Real-Time Monocular Depth Estimation using Synthetic Data with Domain Adaptation via Image Style Transfer," IEEE/CVF Conference on Computer Vision and Pattern Recognition, DOI: 10.1109/CVPR.2018.00296, pp. 2800-2810 (2018).
(Continued)

*Primary Examiner* — Ian L Lemieux
(74) *Attorney, Agent, or Firm* — Finnegan, Henderson, Farabow, Garrett & Dunner, LLP

(57) ABSTRACT

According to one embodiment, a position and attitude estimation device includes a processor. The processor is configured to acquire time-series images continuously captured by a capture device installed on a mobile object, estimate first position and attitude of the mobile object based on the acquired time-series images, estimate a distance to a subject included in the acquired time-series images and correct the estimated first position and attitude to a second position and attitude based on an actual scale, based on the estimated distance.

17 Claims, 22 Drawing Sheets

(56) References Cited

U.S. PATENT DOCUMENTS

| | | | |
|---|---|---|---|
| 11,308,314 B2* | 4/2022 | Hashimoto | G06V 40/20 |
| 2010/0134265 A1* | 6/2010 | Lin | G06T 7/80 |
| | | | 348/148 |
| 2012/0196679 A1* | 8/2012 | Newcombe | A63F 13/00 |
| | | | 463/36 |
| 2014/0285794 A1* | 9/2014 | Ito | G01B 11/24 |
| | | | 356/73 |
| 2017/0243352 A1* | 8/2017 | Kutliroff | G06T 7/10 |
| 2018/0189974 A1* | 7/2018 | Clark | G06T 7/50 |
| 2018/0268225 A1* | 9/2018 | Sakashita | G06V 20/58 |
| 2018/0270413 A1* | 9/2018 | Sakashita | H04N 5/2258 |
| 2019/0007670 A1 | 1/2019 | Sakurai et al. | |
| 2019/0080481 A1 | 3/2019 | Yamaguchi et al. | |
| 2019/0221000 A1* | 7/2019 | Li-Chee-Ming | G06T 7/75 |
| 2019/0259176 A1* | 8/2019 | Dai | G06V 10/40 |
| 2019/0356905 A1* | 11/2019 | Godard | G06T 7/73 |
| 2020/0242378 A1* | 7/2020 | Kim | G06V 10/25 |
| 2020/0334843 A1 | 10/2020 | Kasuya et al. | |
| 2021/0118184 A1* | 4/2021 | Pillai | G06T 7/50 |
| 2021/0279949 A1* | 9/2021 | Cao | G06T 17/00 |
| 2021/0279957 A1* | 9/2021 | Eder | G06Q 30/0205 |
| 2021/0342589 A1* | 11/2021 | Chawla | G06T 7/73 |
| 2021/0350560 A1* | 11/2021 | Laidlow | G06T 7/55 |
| 2022/0198697 A1* | 6/2022 | Gomita | G06T 7/60 |

FOREIGN PATENT DOCUMENTS

| | | | |
|---|---|---|---|
| JP | 2019-49457 A | | 3/2019 |
| JP | 2019-124537 A | | 7/2019 |
| KR | 102310789 B1 * | | 11/2019 |

OTHER PUBLICATIONS

C. Bailer et al., "CNN-based Patch Matching for Optical Flow with Thresholded Hinge Embedding Loss," arXiv:1607.08064v2 [cs.CV], 10 pages (2016).

Y. Bando, et al., "Extracting Depth and Matte using a Color-Filtered Aperture," ACM Transactions on Grapics, vol. 27, No. 5, DOI: 10.1145/1409060.1409087, 9 pages (2008).

A. Chakrabarti, et al., "Depth and Deblurring from a Spectrally-varying Depth-of-Field," European Conf. on Computer Vision—ECCV, 14 pages (2012).

J. Chang, "Pyramid Stereo Matching Network," arXiv:1803.08669v1 [cs.CV], 9 pages (2018).

H. Hirschmüller, "Accurate and Efficient Stereo Processing by Semi-Global Matching and Mutual Information," IEEE Conference on Computer Vision and Pattern Recognition (CVPR), 8 pages, (2005).

A. Kendall et al., "End-to-End Learning of Geometry and Context for Deep Stereo Regression," arXiv:1703.04309v1 [cs.CV], 10 pages (2017).

S. Kim et al., "Multifocusing and Depth Estimation Using a Co lor Shift Model-Based Computational Camera," IEEE Transactions on Image Processing, vol. 21, No. 9, pp. 4152-4166 (2012).

Y. Kuznietsov, et al., "Semi-Supervised Deep Learning forMonocularDepth Map Prediction," arXiv:1702.02706v3 [cs.CV], 14 pag es (2017).

* cited by examiner

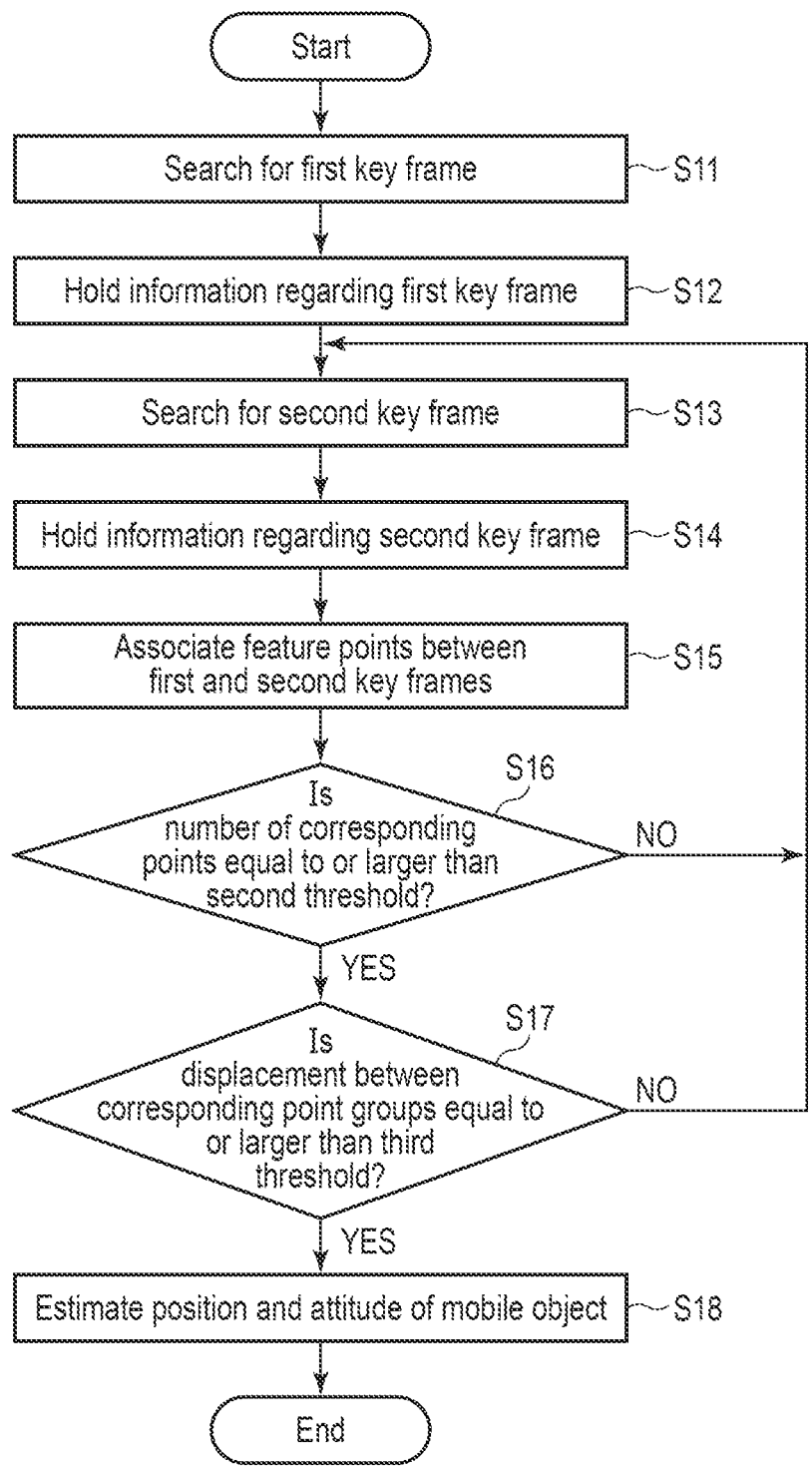
F I G. 5

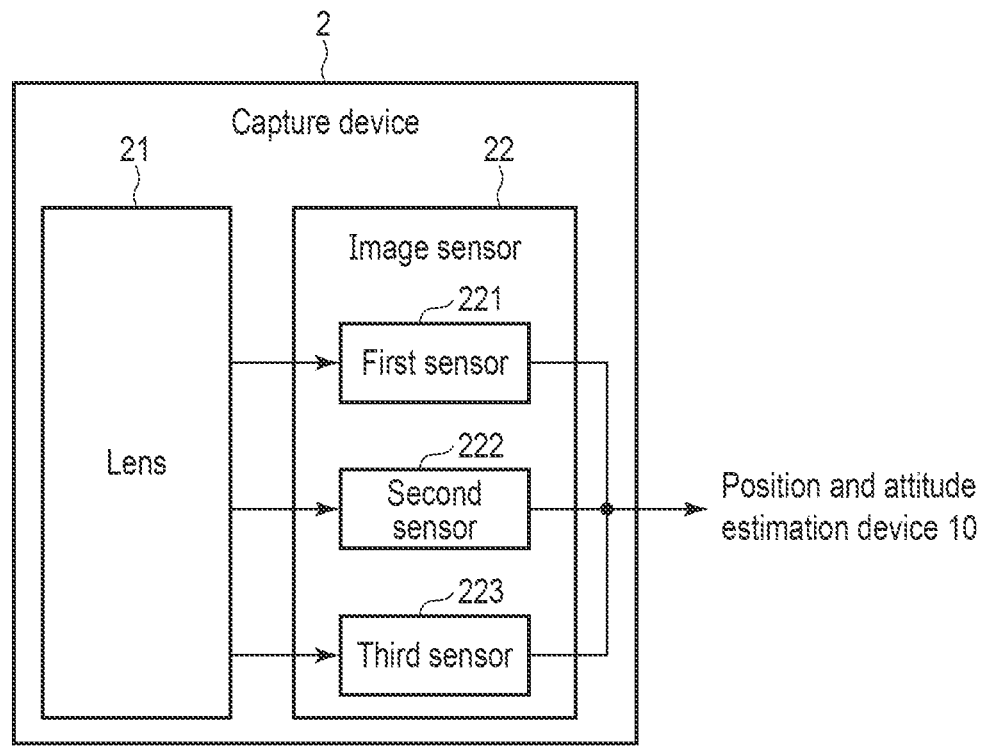
F I G. 6
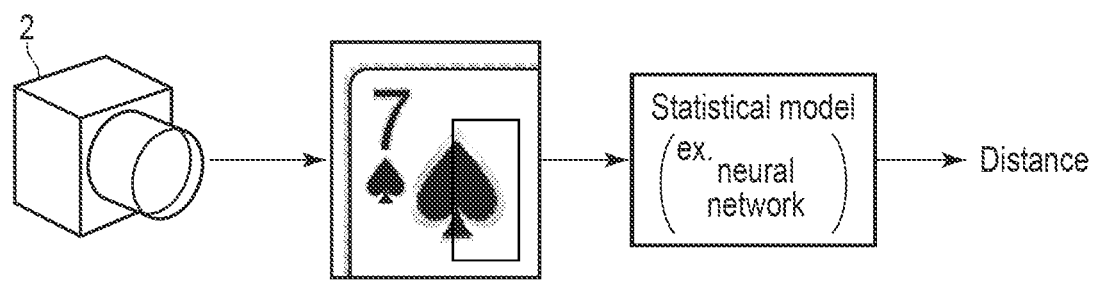
F I G. 7

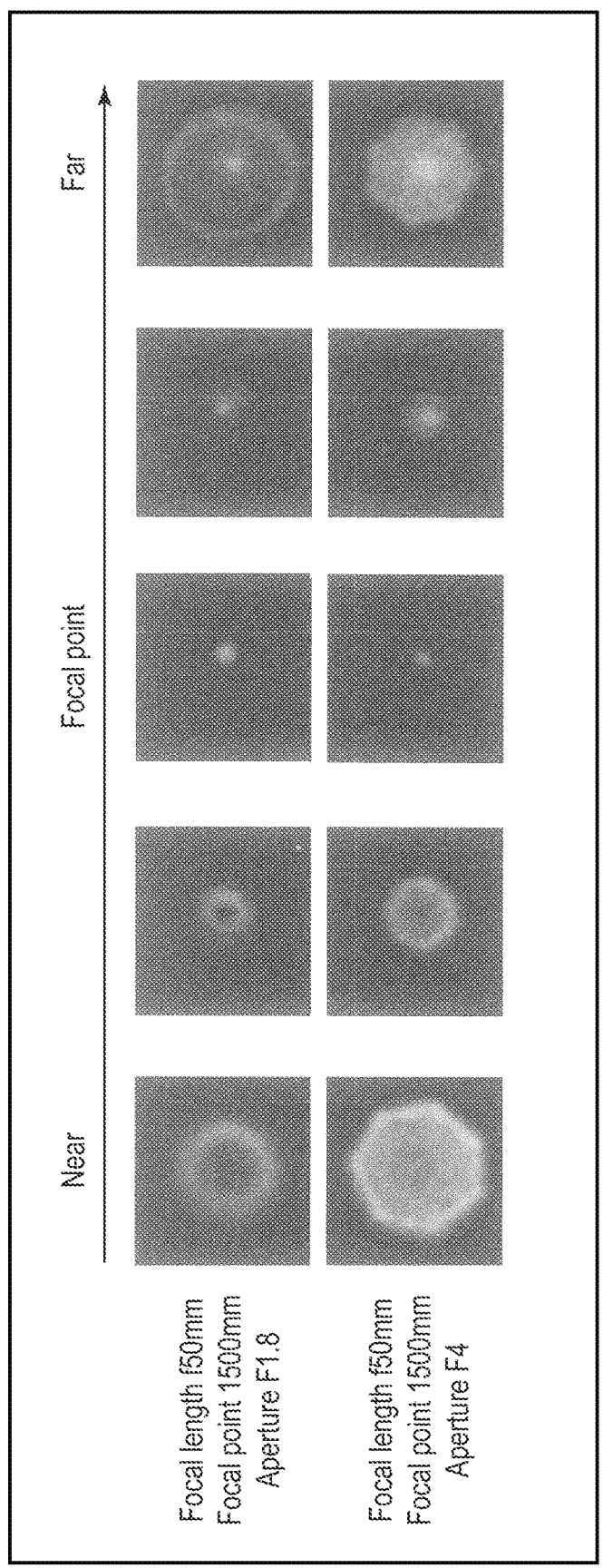
F I G. 10

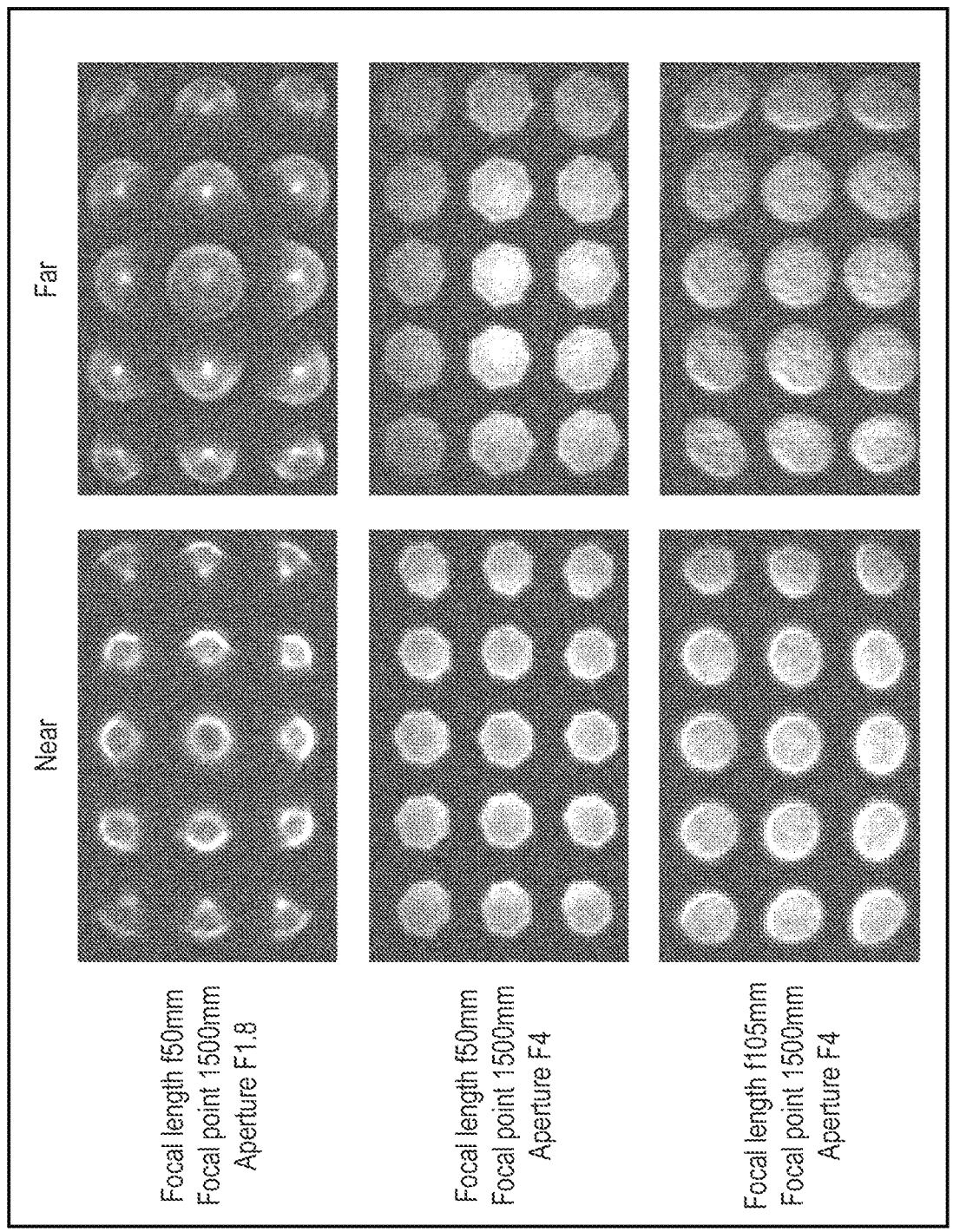
F I G. 13

| Shape | Near | Far |
|---|---|---|
| Circle | ○ | ○ |
| Even-gonal line-symmetric arrangement (PSF has no asymmetry) | ⬡ | ⬡ |
| Odd-gon (PSF has asymmetry) | ⬠ | ⬠ |
| Even-gonal asymmetric arrangement (PSF has asymmetry) | ⬡ | ⬡ |

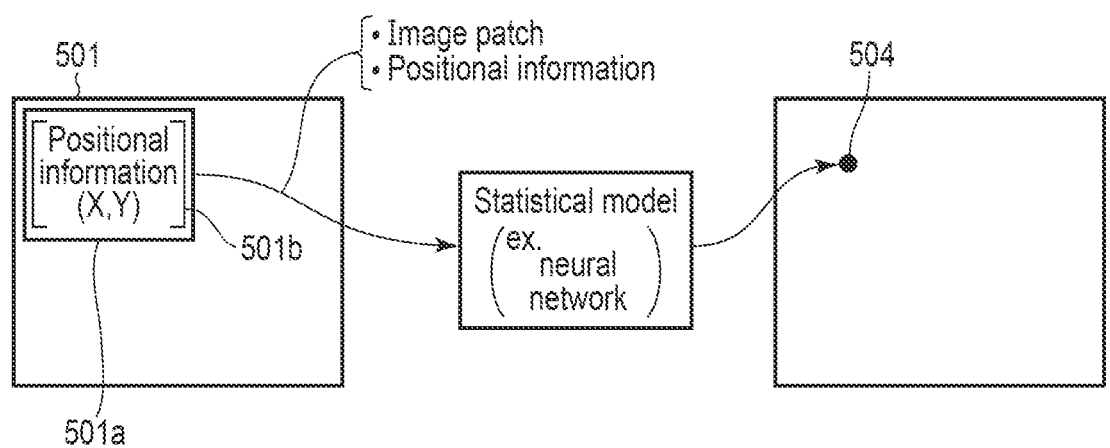
F I G. 19

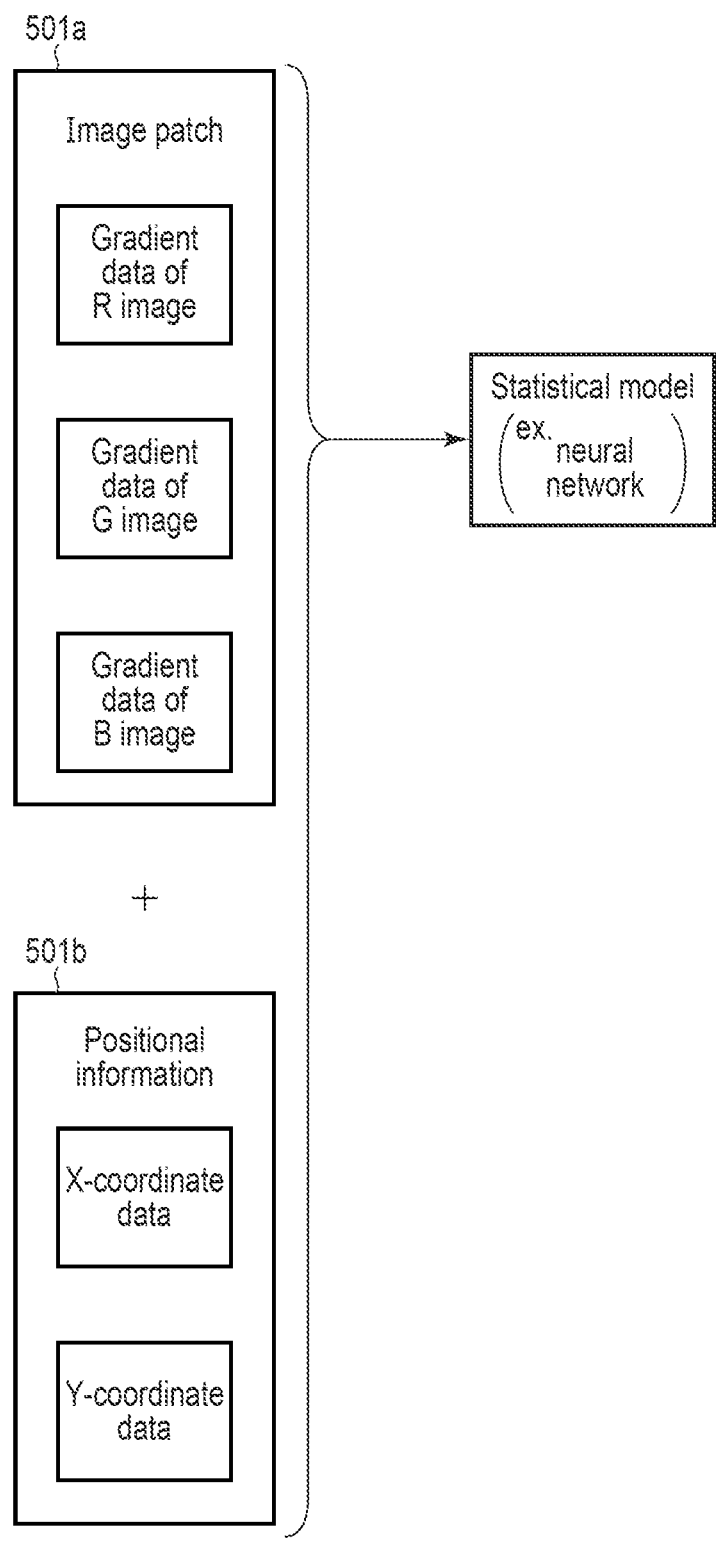
F I G. 20

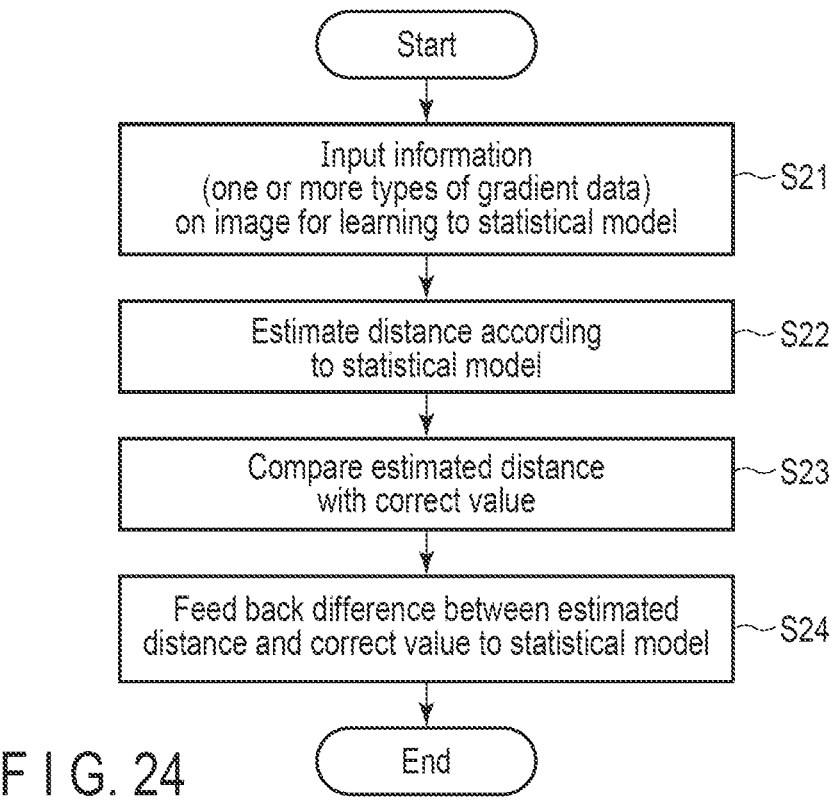
F I G. 24
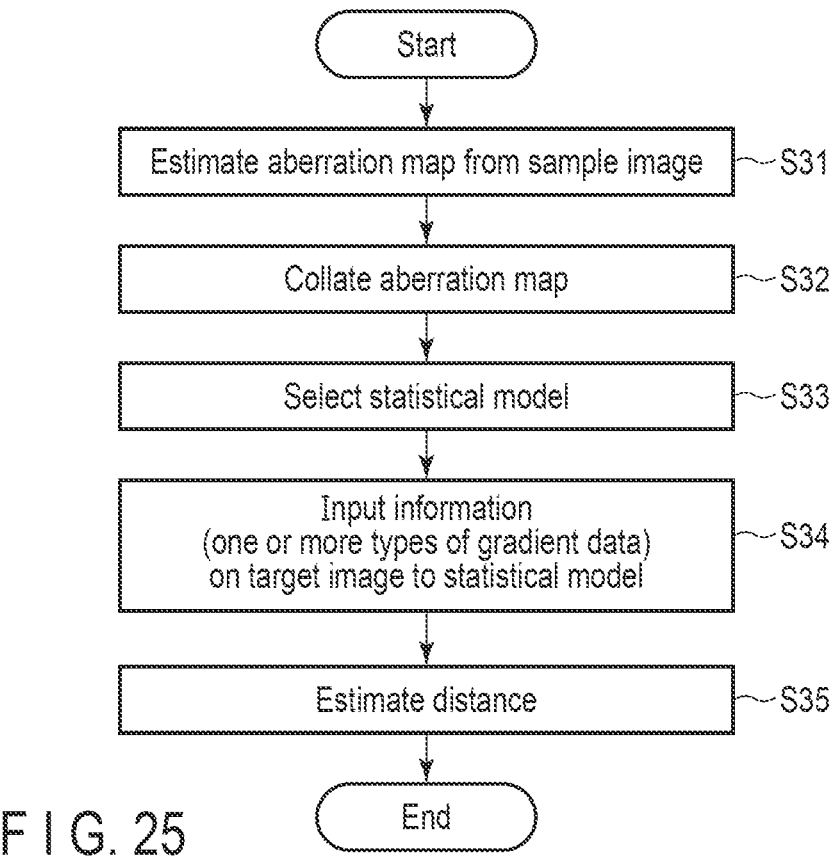
F I G. 25

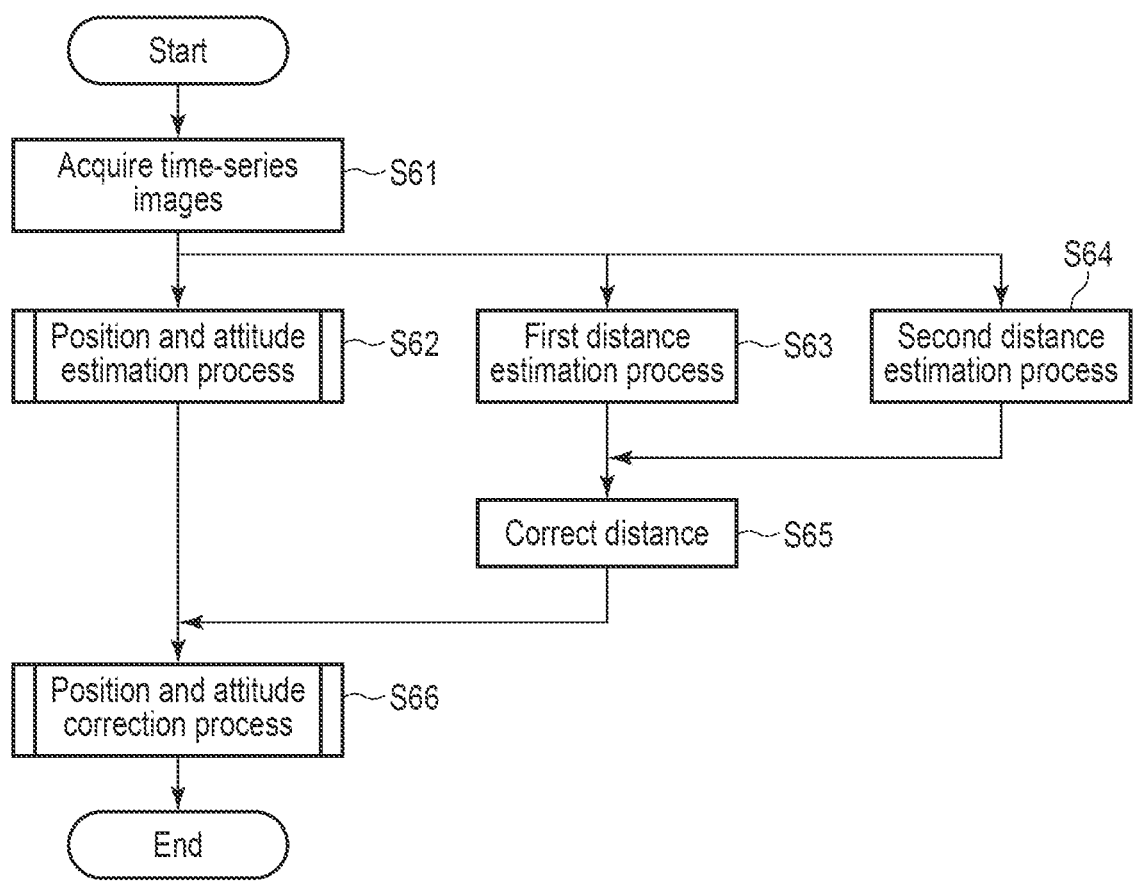
F I G. 30

POSITION AND ATTITUDE ESTIMATION DEVICE, POSITION AND ATTITUDE ESTIMATION METHOD, AND STORAGE MEDIUM

CROSS-REFERENCE TO RELATED APPLICATIONS

This application is based upon and claims the benefit of priority from Japanese Patent Application No. 2020-144877, filed Aug. 28, 2020, the entire contents of which are incorporated herein by reference.

FIELD

Embodiments described herein relate generally to a position and attitude estimation device, a position and attitude estimation method, and a storage medium.

BACKGROUND

In recent years, there is known a technique for estimating a position and an attitude of a mobile object (capture device) from an image captured by the capture device (e.g., a camera) installed in the mobile object such as an automobile and a robot (hereinafter referred to as a position and attitude estimation technique).

Such a position and attitude estimation technique can be used, for example, in an application for generating an efficient movement path of the mobile object.

By the way, the position and attitude of the mobile object estimated by the position and attitude estimation technique needs to be based on an actual scale in order to generate (determine) the movement path of the mobile object in a case where the mobile object moves in a real space.

Specifically, according to the above-described position and attitude estimation technique, for example, the position and attitude of the mobile object (that is, a moving distance and an orientation of the capture device) from a position as a starting point can be obtained, but it is difficult to appropriately generate the movement path of the mobile object because the unit (scale) of the moving distance of the mobile object is indefinite in a case where the position and attitude of the mobile object is not based on the actual scale.

BRIEF DESCRIPTION OF THE DRAWINGS

FIG. 5 is a flowchart illustrating an example of a processing procedure of a position and attitude estimation process.

FIG. 6 is a diagram illustrating an exemplary configuration of a capture device.

FIG. 7 is a diagram for describing an outline of a distance estimation process.

FIG. 10 is a diagram illustrating the relationship between a size of an aperture of a diaphragm mechanism included in an optical system of the capture device and a PSF shape.

FIG. 13 is a diagram illustrating an exemplary PSF shape that occurs at each position in an image.

FIG. 15 is a diagram illustrating the relationship between the nonlinearity of the PSF shape and the shape of the aperture of the diaphragm mechanism.

FIG. 19 is a diagram for describing a second method of estimating a distance from a target image.

FIG. 20 is a diagram illustrating exemplary information to be input into a statistical model in the second method.

FIG. 24 is a flowchart of an example of a processing procedure of a process of generating a statistical model.

FIG. 25 is a flowchart illustrating an example of a processing procedure of a distance estimation process.

FIG. 30 is a flowchart illustrating an example of a processing procedure of the position and attitude estimation device.

DETAILED DESCRIPTION

Figure 1:
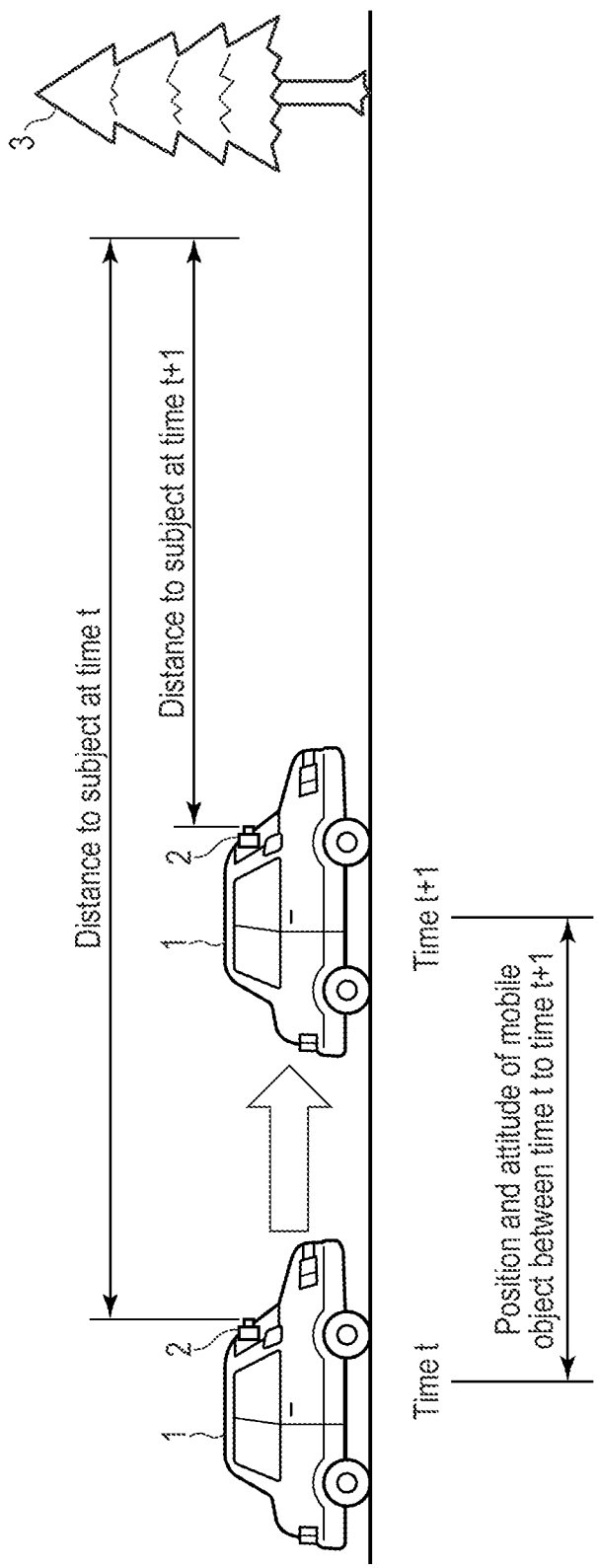
FIG. 1 is a view for describing an outline of a position and an attitude of a mobile object estimated by a position and attitude estimation device according to a first embodiment.

In general, according to one embodiment, a position and attitude estimation device includes a processor. The processor is configured to acquire time-series images continuously captured by a capture device installed on a mobile object, estimate first position and attitude of the mobile object based on the acquired time-series images, estimate a distance to a subject included in the acquired time-series images and correct the estimated first position and attitude to a second position and attitude based on an actual scale, based on the estimated distance.

Various embodiments will be described hereinafter with reference to the accompanying drawings.

First Embodiment

First, a first embodiment will be described. In the present embodiment, a case where a mobile object moves (autonomously travels) in the real space is assumed, and a capture device is installed in the mobile object.

Here, for example, an automobile or the like is assumed as the mobile object in which the capture device is installed in the present embodiment, but robot or an unmanned aerial vehicle (flying object) such as a drone, moving autonomously may be adopted.

The capture device installed in the mobile object is, for example, a monocular camera including a lens and an image sensor, and is used to capture an image. Note that the capture device may be, for example, a fisheye camera or the like. The capture device is installed at a position to capture an image including a subject (observed object) existing in the travel direction of the mobile object, for example.

The position and attitude estimation device according to the present embodiment is connected to the above-described capture device installed in the mobile object to be capable of communicating, and is used to estimate a position and an attitude of the mobile object based on an image captured by the capture device.

In the present embodiment, the position and attitude of the mobile object estimated by the position and attitude estimation device include, for example, (changes of) a position and an attitude of the mobile object from a position as a starting point. That is, "estimating the position and attitude of the mobile object" in the present embodiment is a concept including estimating a moving distance of the mobile object and an orientation (moving direction) of the capture device.

Here, the position and attitude of the mobile object estimated by the above-described position and attitude estimation device can be used, for example, at the time of determining a movement path of the mobile object when the mobile object moves in the real space, and the position and attitude of the mobile object in this case need to be based on an actual scale.

However, it is necessary to capture an image including a known object (subject), such as an augmented reality (AR) marker and a checkerboard, or (a three-dimensional shape of) a subject registered in advance in dictionary data in order to estimate the position and attitude of the mobile object based on the actual scale, based on the image as described above in an environment where the use of a global positioning system (GPS) function is restricted, for example.

In a case where the subject imaged by the capture device is not limited, it is necessary to fuse with a sensor capable of directly measuring a physical quantity such as an inertial measurement unit (IMU).

Further, the positon and attitude of the mobile object can be estimated based on the actual scale, for example, by installing a plurality of capture devices (cameras) or a plurality of sensors on the mobile object. In such a configuration, however, it is necessary to synchronize data among the plurality of capture devices and the plurality of sensors since it is necessary to provide space in the mobile object to install the plurality of capture devices or the plurality of sensors.

Therefore, in the present embodiment, provided is the position and attitude estimation device capable of easily estimating the position and attitude of the mobile object based on the actual scale using the image captured by the capture device that is the monocular camera.

FIG. 1 is a view for describing an outline of the position and attitude of the mobile object estimated by the position and attitude estimation device according to the present embodiment.

Here, a case where the capture device (monocular camera) 2 is installed in a mobile object (automobile) 1, and the capture device 2 continuously captures images while the mobile object 1 is moving is assumed as illustrated in FIG. 1.

Here, a position and an attitude of the mobile object 1 (that is, a moving distance and an orientation of the capture device 2), which has moved between time t and time t1, can be estimated from an image captured by the capture device 2 at time t and an image captured by the capture device 2 at time t1.

However, there is a case where the position and attitude of the mobile object. 1 estimated in this manner is not based on the actual scale.

Thus, in the present embodiment, a distance to a subject 3 included in the image captured by the capture device 2 at time t and a distance to the subject 3 included in the image captured by the capture device 2 at time t+1 are estimated, and the position and attitude of the mobile object 1 are expressed (namely, corrected) on the actual scale, based on the estimated distance.

In the present embodiment, the actual scale is a concept including a unit used in the real space. For example, the position and attitude based on the actual scale mean the position and attitude (moving distance and orientation of the capture device 2) determined based on the unit used in the real space.

Hereinafter, the position and attitude estimation device according to the present embodiment will be described in detail. In the present embodiment, the position and attitude estimation device is, for example, an information processing device (electronic device) such as a personal computer, but may be configured to be mounted on the mobile object 1 together with the capture device 2.

Figure 2:
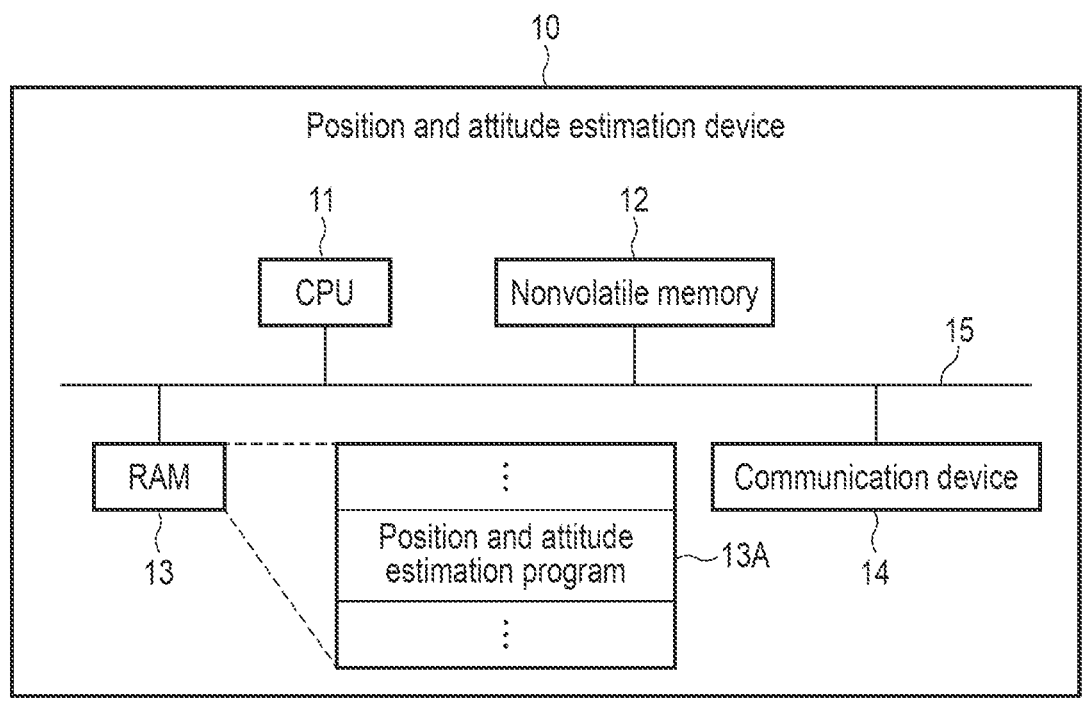
FIG. 2 is a diagram illustrating an exemplary system configuration of the position and attitude estimation device.

FIG. 2 illustrates an exemplary system configuration of a position and attitude estimation device 10. The position and attitude estimation device 10 includes a CPU 11, a nonvolatile memory 12, a RAM 13, a communication device 14, and the like. Note that the CPU 11, the nonvolatile memory 12, the RAM 13, and the communication device 14 are connected to each other via a bus 15.

The CPU 11 is a processor configured to control operations of various components in the position and attitude estimation device 10. The CPU 11 may be a single processor or may be formed of a plurality of processors. The CPU 11 performs various programs loaded from the nonvolatile memory 12 to the RAM 13. Examples of the programs include an operating system (OS) and various application programs. The application program performed by the CPU 11 in this manner includes a position and attitude estimation program 13A configured to estimate a position and an attitude of the mobile object 1.

The nonvolatile memory 12 is a storage medium for use as an auxiliary storage. The RAM 13 is a storage medium for use as a main storage. Although only the nonvolatile memory 12 and the RAM 13 are illustrated in FIG. 2, the position and attitude estimation device 10 may include a different storage, such as a hard disk drive (HDD) and a solid state drive (SSD).

The communication device 14 is a device configured to perform wired communication or wireless communication. The position and attitude estimation device 10 can perform communication with the capture device 2 via the communication device 14 and receive (acquire) an image captured by the capture device 2.

Although not illustrated in FIG. 2, the position and attitude estimation device 10 may further include an input device such as a mouse and a keyboard, and a display device such as a display.

Figure 3:
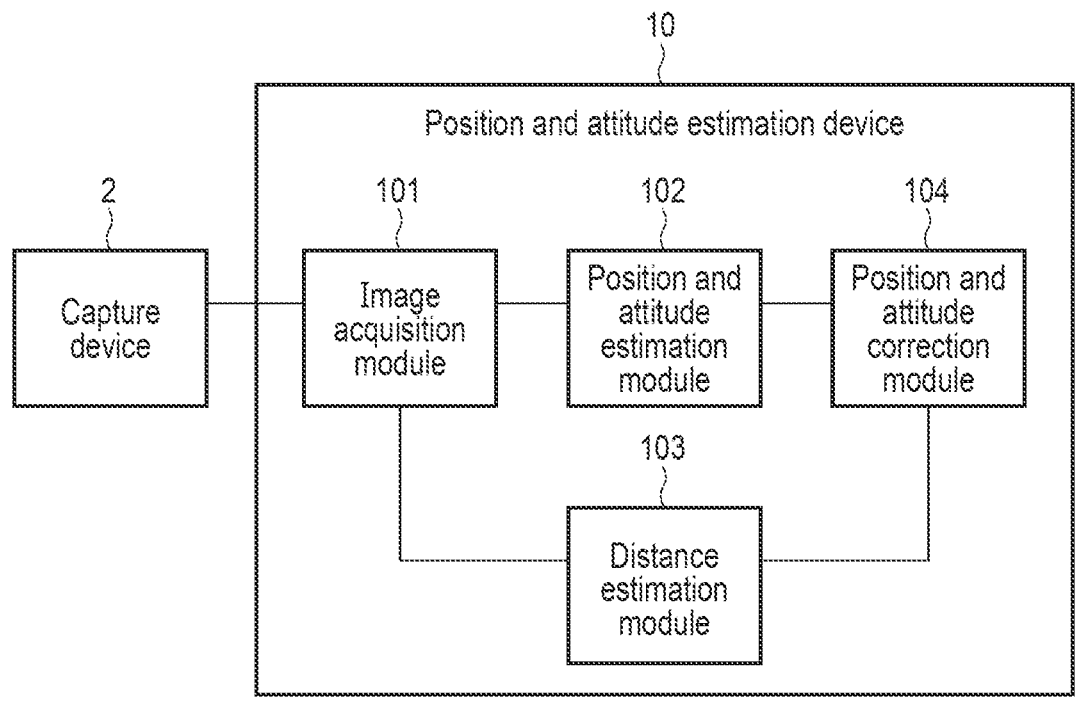
FIG. 3 is a block diagram illustrating an example of a functional configuration of the position and attitude estimation device.

FIG. 3 is a block diagram illustrating an example of a functional configuration of the position and attitude estimation device 10. As illustrated in FIG. 3, the position and attitude estimation device 10 is connected to the capture device 2 to be capable of communicating, and includes an image acquisition module 101, a position and attitude estimation module 102, a distance estimation module 103, and a position and attitude correction module 104.

In the present embodiment, it is assumed that some or all of the respective modules 101 to 104 included in the position and attitude estimation device 10 are achieved as the CPU 11 (that is, a computer of the position and attitude estimation device 10) performs the position and attitude estimation program 13A, that is, by software. Note that the position and attitude estimation program 13A may be stored in a computer-readable storage medium for distribution, or may be downloaded to the position and attitude estimation device 10 through a network.

Here, the description has been given assuming that the CPU 11 performs the position and attitude estimation program 13A, but some or all of the respective modules 101 to 104 may be achieved by hardware such as an integrated circuit (IC), or may be achieved by a combination of software and hardware.

The image acquisition module 101 acquires (receives) an image including the subject 3 captured by the capture device 2 from the capture device 2. The image acquisition module 101 acquires time-series images (at least two images) continuously captured by the capture device 2.

The position and attitude estimation module 102 estimates the position and attitude of the mobile object 1 in which the capture device 2 capturing the image is installed, based on the time-series images acquired by the image acquisition module 101.

The distance estimation module 103 estimates a distance to the subject (observed object projected on the image) 3 included in each of the time-series images acquired by the image acquisition module 101. Note that the distance to the subject 3 estimated by the distance estimation module 103 is the distance based on the actual scale (distance based on the unit used in the real space).

Here, the position and attitude of the mobile object 1 estimated by the position and attitude estimation module 102 described above are not based on the actual scale, and indicate, for example, relative position and attitude from a position as a starting point.

Thus, in the present embodiment, the position and attitude correction module 104 corrects the position and attitude of the mobile object 1 estimated by the position and attitude estimation module 102 to the position and attitude based on the actual scale, based on the distance estimated by the distance estimation module 103 (that is, the position and attitude of the mobile object 1 estimated by the position and attitude estimation module 102 are expressed on the actual scale).

Next, an example of a processing procedure of the position and attitude estimation device 10 according to the present embodiment will be described with reference to the flowchart of FIG. 4.

First, in a case where the position and attitude of the mobile object 1 are estimated by the position and attitude estimation device 10, the capture device 2 installed in the mobile object 1 is activated. As a result, the capture device 2 continuously captures images including the subject 3 existing in a travel direction of the mobile object 1 while the mobile object 1 is moving.

Note that the image captured by the capture device 2 in the present embodiment may be a color image constituted by, for example, an image (R image) generated by detecting light in a red (R) wavelength band, an image (G image) generated by detecting light in a green (G) wavelength band, and an image (B image) generated by detecting light in a blue (B) wavelength band (namely, an image constituted by three channels of RGB), or may be a monochrome image (a one-channel image represented in grayscale).

The image acquisition module 101 acquires time-series images continuously captured by the capture device 2 (step S1). The time-series image acquired at step S1 includes at least two images (frames). In the following description, the time-series images acquired at step S1 are referred to as target images for convenience.

When the processing at step S1 is performed, the position and attitude estimation module 102 performs a process of estimating the position and attitude of the mobile object 1 (hereinafter referred to as a position and attitude estimation process) based on the target images (step S2).

In step S2, for example, a plurality of feature points is detected from the target images (at least two images, respectively), and the relative position and attitude of the mobile object 1 are estimated (calculated) by associating the plurality of detected feature points between the target images. Note that details of the position and attitude estimation process performed at step S2 will be described below.

When the processing at step S1 is performed, the distance estimation module 103 performs a process of estimating a distance to the subject 3 included in the target image (hereinafter, referred to as a distance estimation process) (step S3).

In step S3, for example, the distance to the subject 3 can be estimated by using bokeh (bokeh information) generated in the target image as a physical clue. Note that details of the distance estimation process performed at step 23 will be described below.

When the processing at steps S2 and S3 are performed, the position and attitude correction module 104 performs a process (hereinafter referred to as a position and attitude correction process) of correcting the position and attitude of the mobile object 1 estimated by performing the processing at step S2 (the position and attitude estimation process) based on the distance estimated by performing the processing at step S3 (the distance estimation process) (step S4). The position and attitude of the mobile object 1, corrected by performing the processing at step S4 (the position and attitude correction process), correspond to the position and attitude of the mobile object 1 based on the actual scale. Note that details of the position and attitude correction process will be described below.

Figure 4:
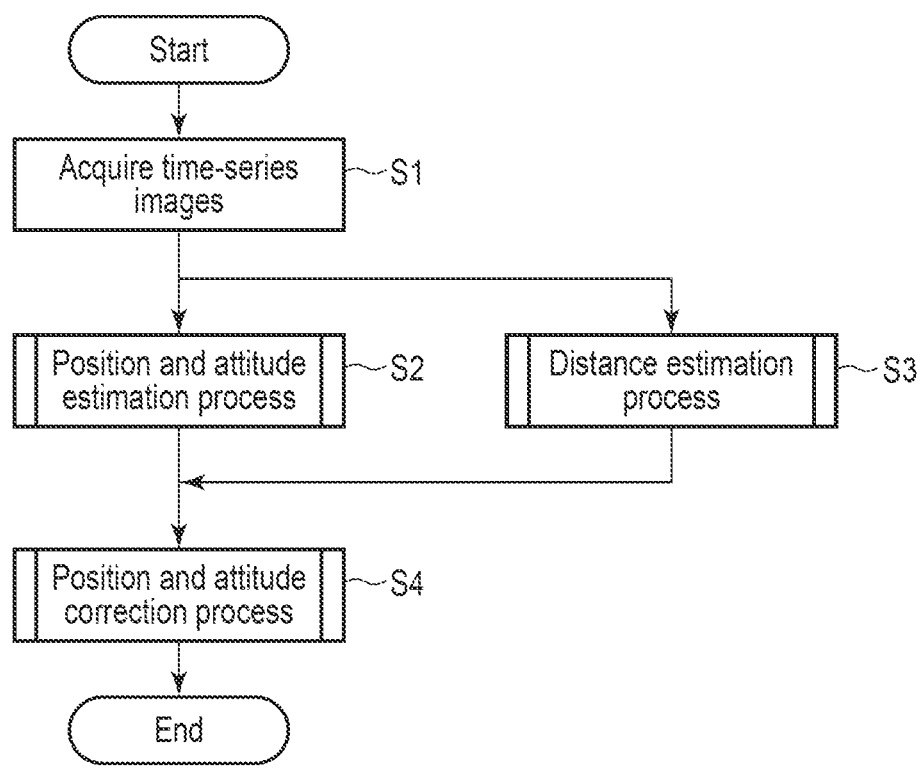
FIG. 4 is a flowchart illustrating an example of a processing procedure of the position and attitude estimation device.

Although the position and attitude of the mobile object 1 based on the actual scale can be obtained (estimated) using the capture device 2, which is the monocular camera, by performing the processing illustrated in FIG. 4 in the present embodiment, the position and attitude estimation process at step S2 and the distance estimation process at step S3 are performed independently (or in parallel) in the processing illustrated in FIG. 4.

Here, there is a case where it is difficult to obtain (estimate) the position and attitude of the mobile object 1 and the distance to the subject 3 from the image captured by the capture device 2, for example, depending on an environment in the real space where the mobile object 1 moves or the like.

However, the position and attitude estimation process and the distance estimation process are performed independently according to the present embodiment, and thus, the position and attitude of the mobile object 1 can be estimated by performing the position and attitude estimation process at step S2, for example, even if an image in which it is difficult to estimate the distance is acquired at step S1. Similarly, for example, even when an image in which it is difficult to estimate the position and attitude of the mobile object 1 is acquired at step S1, the distance to the subject 3 can be estimated by performing the distance estimation process at step S3.

In a case where only one of the position and attitude estimation process and the distance estimation process is performed, it is difficult to perform the processing at step S4 (that is, obtain the position or attitude of the mobile object 1 based on the actual scale), but the information (position and attitude of the mobile object 1 or distance to the subject 3) obtained by performing one of the position and attitude estimation process and the distance estimation process can be used for other processes and the like.

Next, an example of a processing procedure of the position and attitude estimation process (process of step S2 illustrated in FIG. 4) will be described with reference to a flowchart in FIG. 5. Note that the processing illustrated in FIG. 5 is processing performed in a case where simultaneous localization and mapping (SLAM) is applied to the target image in order to estimate the position and attitude of the mobile object 1, and is referred to as SLAM processing.

First, the position and attitude estimation module 102 searches for a first key frame from the target images (time-series images acquired at step S1 illustrated in FIG. 4) (step S11). The first key frame searched at step S11 is an image (frame) serving as a key for estimating the position and attitude of the mobile object 1 out of (a plurality frames included in) the target image.

Here, the processing at step S11 will be described. In step S11, first, a feature point group is extracted from one frame (hereinafter referred to as a target frame) of the target images (time-series images). In the present embodiment, the feature points include an edge, a corner, and the like on a target frame detected using a local feature value in the target frame. A plurality of the feature points is extracted from the target frame. Further, as the feature value used to extract the feature point, for example, ORB, BRIEF, FAST, AKAZE, SIFT, or the like can be used.

Next, it is determined whether or not the number of feature points included in the feature point group extracted from the target frame is equal to or larger than a predetermined value (hereinafter referred to as a first threshold). This first threshold may be a dynamically changed value.

When it is determined that the number of feature points is equal to or larger than the first threshold, the target frame is searched (specified) as the first key frame.

On the other hand, when it is determined that the number of feature points is not equal to or larger than the first threshold (that is, smaller than the first threshold), the target frame is not recognized (searched) as the first key frame, and the above processing is repeated with another frame included in the target image as the target frame.

The position and attitude estimation module 102 holds the first key frame searched at step S11 and the feature points (image feature points) extracted from the first key frame as information regarding the first key frame (step S12).

Next, the position and attitude estimation module 102 searches for a second key frame from the target images (step S13). In this case, the second key frame is searched from frames included in the target images (time-series images) and following the first key frame described above. Since the processing at step S13 is the same process as the processing at step S11, the detailed description thereof will be omitted here.

The position and attitude estimation module 102 holds the second key frame searched at step S13 and feature points extracted from the second key frame as information regarding the second key frame (step S14).

Next, the position and attitude estimation module 102 detects the feature points extracted from the second key frame respectively corresponding to the feature points extracted from the first key frame to perform association of feature points (feature point tracking) between the first key frame and the second key frame (step S15). Note that the association of feature points can be achieved using, for example, template matching, the Lucas-Kanade method, SIFT, or the like. In the following description, the two feature points associated at step S15 are referred to as corresponding points for convenience.

When the processing at step S15 is performed, the position and attitude estimation module 102 determines whether or not the number of corresponding points associated at step S15 is equal to or larger than a predetermined value (hereinafter referred to as a second threshold) (step S16).

When it is determined that the number of corresponding points is not equal to or larger than the second threshold (that is, smaller than the second threshold) (NO at step S16), the processing is repeated returning to step S13. In this case, a new second key frame is searched at step S13. Note that not only the second key frame but also the first key frame may be searched again as the processing is repeated returning to step S11.

On the other hand, when it is determined that the number of corresponding points is equal to or larger than the second threshold (YES at step S16), the position and attitude estimation module 102 determines whether or not a displacement between the corresponding point groups is equal to or larger than a predetermined value (hereinafter referred to as a third threshold) (step S17). In this case, the position and attitude estimation module 102 calculates, for example, a displacement between corresponding points (two feature points) for each corresponding point, and determines whether or not the sum of the calculated displacements is equal to or larger than the third threshold.

When it is determined that the displacement between the corresponding point groups is nor equal to or larger than the third threshold (that is, smaller than the third threshold) (NO at step S17), the processing is repeated returning to step S13. Note that it may be configured such that the processing is repeated returning to step S11 as described above.

When it is determined that the displacement between the corresponding point groups is equal to or larger than the third threshold (YES at step S17), the position and attitude estimation module 102 estimates (calculates) the position and attitude of the mobile object 1 using the above-described corresponding points (step S18).

In step S18, it is possible to calculate the position and attitude of the mobile object 1 using, for example, an elementary matrix, a basic matrix, a projective transformation matrix, or the like based on a set of camera coordinates (coordinates on the first and second key frames) of a plurality of feature points. In this case, for example, the movement of the mobile object 1 from a position and an attitude of the mobile object 1 at the time when (an image corresponding to) the first key frame has been captured to a position and an attitude of the mobile object 1 at the time when (an image corresponding to) the second key frame has been captured is estimated, and the relative position and attitude of the mobile object 1 are estimated based on the estimated movement.

The position and attitude estimation module 102 can estimate the relative position and attitude, calculated by associating the plurality of feature points detected from each of at least two images (the first and second key frames) between the two images, as the position and attitude of the mobile object 1 by performing the above-described processing (SLAM processing) illustrated in FIG. 5.

Note that the position and attitude of the mobile object 1 estimated at step S1.8 are expressed by, for example, a combination of quaternions representing coordinates (that is, three-dimensional coordinates) and rotation (orientation) in a three-dimensional space.

However, for example, in a case where it can be assumed that the mobile object 1 moves on a plane (that is, the mobile object 1 moves only on a floor surface), the position and attitude of the mobile object 1 may be expressed by 3 degrees of freedom, which is a combination of 2 degrees of freedom related to translation and 1 degree of freedom related to rotation.

Further, for example, a rotation matrix, vectors representing a rotation axis and a rotation direction, Euler angles, or the like may be used, instead of the above-described quaternions, in order to express the position and attitude of the mobile object 1 in the three-dimensional space.

Although the position and attitude of the mobile object 1 can be estimated according to the above-described processing illustrated in FIG. 5, a process of estimating three-dimensional coordinates of each of the above-described feature points (each corresponding point) and optimizing the estimated three-dimensional coordinates of the respective feature points and the position and attitude of the mobile object 1 may be further performed in this processing.

Note that the description has been given in the present embodiment regarding the case where the position and attitude of the mobile object 1 are estimated by applying SLAM to the time-series images captured by the capture device 2 (that is, performing the SLAM processing), hut the position and attitude of the mobile object 1 may be estimated by performing other processing.

Specifically, the position and attitude of the mobile object 1 when the target images have been captured may be estimated for example, by applying the structure from motion (SIM) to the target images (time-series images).

Next, the above-described distance estimation process (process of step S3 illustrated in FIG. 4) will be described in detail.

Here, FIG. 6 illustrates an exemplary configuration of the capture device 2 installed in the mobile object 1. The capture device 2 is used to capture the image including the subject 3 existing in the travel direction of the mobile object 1 as described above. The capture device 2 includes a lens 21 and an image sensor 22. The lens 21 and the image sensor 22 correspond to an optical system of the capture device 2 (monocular camera).

Light reflected on the subject 3 enters the lens 21. The light having entered the lens 21 passes through the lens 21. The light having passed through the lens 21 reaches the image sensor 22, so that the image sensor 22 receives (detects) the light. The image sensor 22 converts (photo-electrically converts) the received light into an electric signal to generate an image of a plurality of pixels.

Note that, for example, the image sensor 22 is achieved by a charge coupled device (CCD) image sensor or a complementary metal oxide semiconductor (CMOS) image sensor. For example, the image sensor 22 includes a first sensor (R sensor) 221 that detects light in a red (R) wavelength band, a second sensor. (G sensor) 222 that detects light in a green (G) wavelength band, and a third sensor (B sensor) 223 that detects light in a blue (B) wavelength band. The image sensor 22 can receive light in the wavelength bands corresponding to the first to third sensors 221 to 223, and generate sensor images (R image, G image, and B image) corresponding to the respective wavelength bands (color components). That is, an image that the capture device 2 captures is a color image (RGB image), and the image includes the R image, the G image, and the B image.

Note that the image sensor 22 including the first to third sensors 221 to 223 will be described in the present embodiment. However, the image sensor 22 needs to include at least one of the first to third sensors 221 to 223. Further, the image sensor 22 may include a sensor for generation of a monochrome image, instead of including the first to third sensors 221 to 223.

In the present embodiment, the image generated based on the light having passed through the lens 21 (that is, the image captured by the capture device 2) is the image that has been affected by the aberration of (lens 21 included in) the optical system, and thus, includes bokeh due to the aberration. Note that the bokeh that occurs in the image will be described in detail below.

Although not illustrated in FIG. 6, the capture device 2 further includes a focus adjustment mechanism (lens drive circuit) configured to control the focal point by, for example, adjusting a position of the lens 21, and a diaphragm mechanism. (aperture control circuit) having an aperture to adjust the quantity of light (quantity of incident light) taken into the optical system of the capture device 2.

Next, an outline of the distance estimation process will be described with reference to FIG. 7. In the present embodiment, the capture device 2 (image sensor 22) captures (generates) an image affected by the aberration of the optical system (lens 21) as described above.

Here, in the present embodiment, it is assumed that a statistical model, used to estimate the distance to the subject 3 from an image captured by the capture device 2, is held in the position and attitude estimation device 10 (or the distance estimation module 103). This statistical model is generated by learning of the bokeh that occurs in the image affected by the aberration of the optical system and varies non-linearly in accordance with the distance to the subject 3 included in the image.

Note that such a statistical model can be generated by application of various known machine learning algorithms, such as a neural network and a random forest. Examples of the neural network applicable in the present embodiment may include a convolutional neural network (CNN), a fully connected neural network, and a recurrent neural network.

Thus, the distance estimation module 103 acquires an image (that is, target image) captured by the capture device 2 and inputs the image into the statistical model.

In this case, the distance estimation module 103 acquires the distance to the subject 3 included in the image output from the statistical model in which the image has been input.

In this manner, the distance to the subject 3 cars be estimated from the image captured by the capture device 2 using the above-described statistical model in the present embodiment.

Here, in the present embodiment, the image captured by the capture device 2 includes bokeh due to the aberration of the optical system (lens aberration) of the capture device 2 as described above.

The bokeh that occurs in the image captured by the capture device 2, will be described below. First, chromatic aberration, related to the bokeh due to the aberration of the optical system of the capture device 2, will be described.

Figure 8:
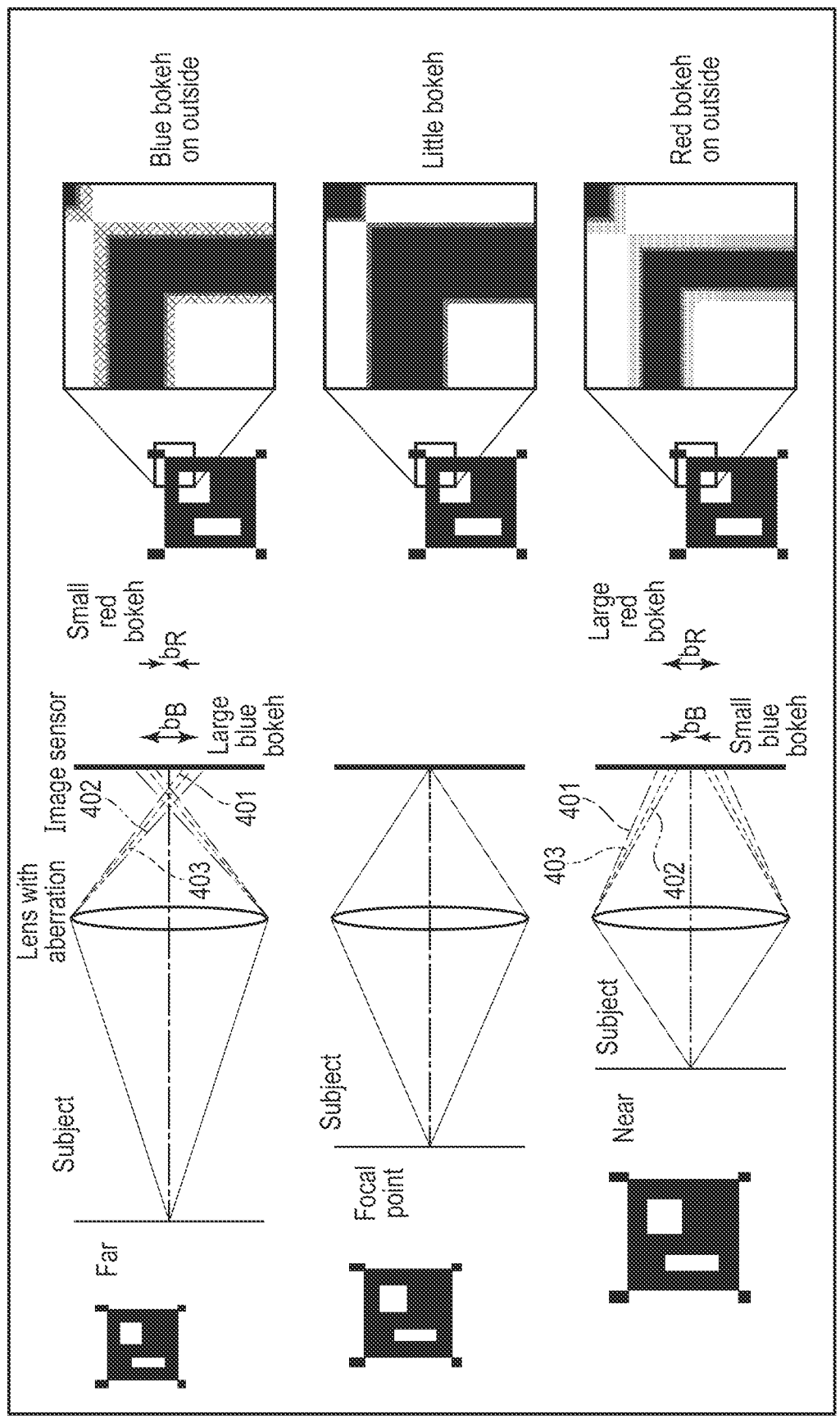
FIG. 8 is a diagram illustrating the relationship between a distance to a subject and bokeh that occurs in an image due to chromatic aberration in a case where a single lens is used.

FIG. 8 illustrates the relationship between the distance to the subject and the bokeh that occurs in the image due to the chromatic aberration. In the following description, the in-focus position in the capture device 2 is referred to as the focal point.

The refractive index of the lens 21 having aberration varies every wavelength band of light to pass therethrough. Thus, for example, in a case where the position of the subject is shifted from the focal point, the respective rays of light in the wavelength bands do not converge to one point and thus reach different points. As a result, the chromatic aberration (bokeh) appears on the image.

FIG. 8 illustrates, on the upper side thereof, a case where the position of the subject is far from the capture device 2 (image sensor 22) with respect to the focal point (namely, the position of the subject is on the tar side of the focal point).

In this case, regarding light 401 in the red wavelength band, the image sensor 22 (first sensor 221) generates an image including a relatively small bokeh bR. Meanwhile, regarding light 402 in the blue wavelength band, the image sensor 22 (third sensor 223) generates an image including a relatively large bokeh bB. Note that, regarding the light 403 in the green wavelength band, art image including bokeh having are intermediate size between the bokeh bR and the bokeh bB is generated. Therefore, in the image captured with the position of the subject far with respect to the focal point, blue bokeh is observed outside the subject in the image.

Meanwhile, FIG. 8 illustrates, on the lower side thereof, a case where the position of the subject is near to the capture device 2 (image sensor 22) with respect to the focal point (namely, the position of the subject is on the near side of the focal point).

In this case, regarding the light 401 in the red wavelength band, the image sensor 22 (first sensor 221) generates an image including a relatively large bokeh bR. Meanwhile, regarding the light 402 in the blue wavelength band, the image sensor 22 (third sensor 223) generates an image including a relatively small bokeh bB. Note that, regarding the light 403 in the green wavelength band, an image including bokeh intermediate in size between the bokeh bR and the bokeh bB is generated. Therefore, in the image captured with the position of the subject near with respect to the focal point, a red bokeh is observed outside the subject in the image.

Here, FIG. 8 illustrates the example in which the lens 21 that is the simple single lens. However, for example, a lens subjected to chromatic aberration correction (hereinafter, referred to as an achromatic lens) is used in the capture device 2 in general. Note that the achromatic lens is a combination of a low-dispersion convex lens and a high-dispersion concave lens and is smallest in the number of lenses among lenses for correction of chromatic aberration.

Figure 9:
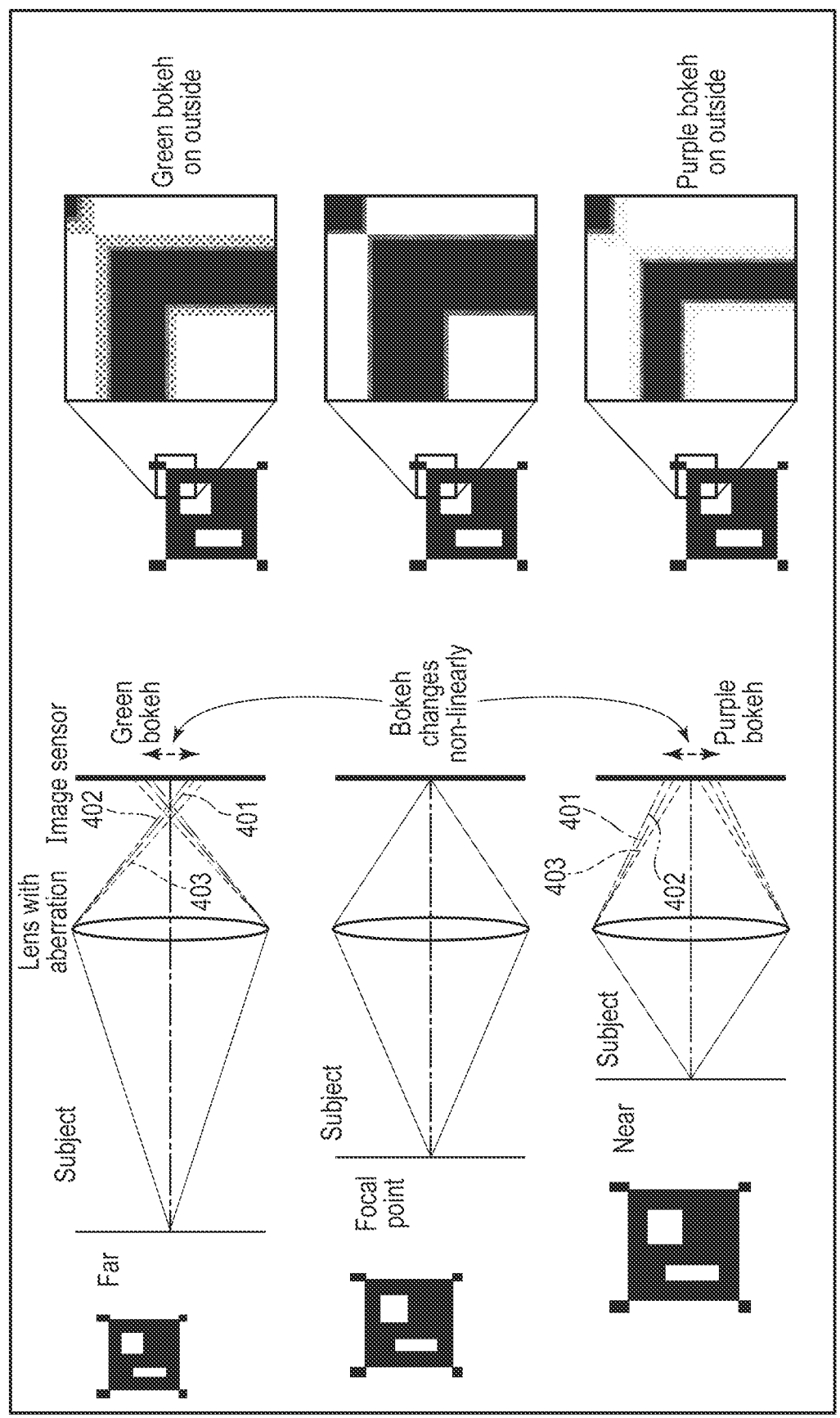
FIG. 9 is a diagram illustrating the relationship between a distance to a subject and bokeh that occurs in an image due to chromatic aberration in a case where an achromatic lens is used.

FIG. 9 illustrates the relationship between the distance to the subject and the bokeh that occurs in the image due to the chromatic aberration in a case where the achromatic lens is used as the lens 21. Although the achromatic lens is designed to have the focal point constant between blue wavelength and red wavelength, the chromatic aberration cannot be eliminated completely. Thus, in a case where the position of the subject is far with respect to the focal point, green bokeh occurs as illustrated on the upper side of FIG. 9. In a case where the position of the subject is near with respect to the focal point, purple bokeh occurs as illustrated on the lower side of FIG. 9.

Note that FIGS. 8 and 9 each illustrate, on the middle side thereof, a case where the position of the subject to the capture device 2 (image sensor 22) coincides with the focal point. In each case, the image sensor 22 (first to third sensors 221 to 223) generates an image having bokeh less in amount.

Here, because the diaphragm mechanism is provided in (the optical system of) the capture device 2 as described above, the shape of the bokeh that occurs in the image captured by the capture device 2 varies due to the size of the aperture of the diaphragm mechanism. Note that the shape of the bokeh is referred to as a point spread function (PSF) shape, and indicates the diffusion distribution of light that occurs at the time of capturing of a point light source.

Note that, in the following description, the focal length means the distance from the lens to the position at which parallel light that has entered the lens converges. The f-number results from numerical conversion of the quantity of light to be taken in the capture device 2 in accordance with the diaphragm mechanism. Note that, as the f-number decreases in value, the quantity of light to be taken in the capture device 2 increases (namely, the aperture increases in size).

FIG. 10 illustrates, from left on the upper side thereof, the PSF shape that occurs in the central portion of the image captured by the capture device 2 including a lens having a focal length of 50 mm with the focal point and the f-number (aperture) that are 1500 mm and F1.8, respectively, in (the optical system of) the capture device 2, in order of the position of the subject closer to the capture device 2. FIG. 10 illustrates, from left on the lower side thereof, the PSF shape that occurs in the image captured by the capture device 2 including a lens having a focal length of 50 mm with the focal point and the f-number (aperture) that are 1500 mm and F4, respectively, in (the optical system of) the capture device 2, in order of the position of the subject closer to the capture device 2. Note that FIG. 10 illustrates, at the center on each of the upper side and the lower side thereof, the PSF shape in a case where the position of the subject coincides with the focal point.

The respective PSF shapes illustrated at the corresponding positions on the upper side and the lower side of FIG. 10 are identical in the position of subject to the capture device 2. However, even in a case where identification is satisfied in the position of subject, the PSI shape on the upper side (PSI shape that occurs in the image captured with the f-number being F1.8) and the PSI shape on the lower side (PSI shape that occurs in the image captured with the f-number being F4) are different in shape.

Furthermore, as indicated in the PSI shape on the leftmost side of FIG. 10 and the PSI shape on the rightmost side of FIG. 10, the PSF shapes in a case where the position of the subject is closer than the focal point are different from those in a case where the position of the subject is farther than the focal point even when, for example, the distance from the subject position to the focal point is approximately the same.

Figure 11:
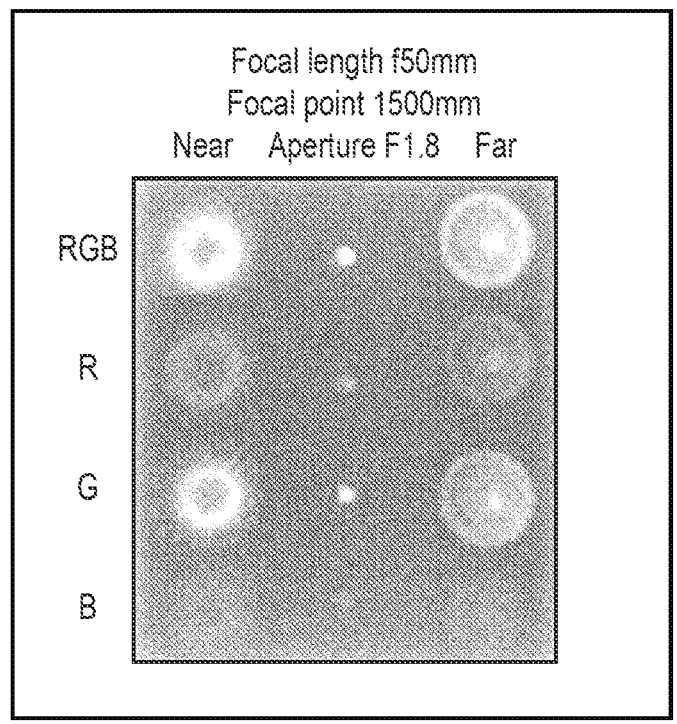
FIG. 11 is a diagram illustrating an exemplary PSF shape that occurs in an image on each channel.
Figure 12:
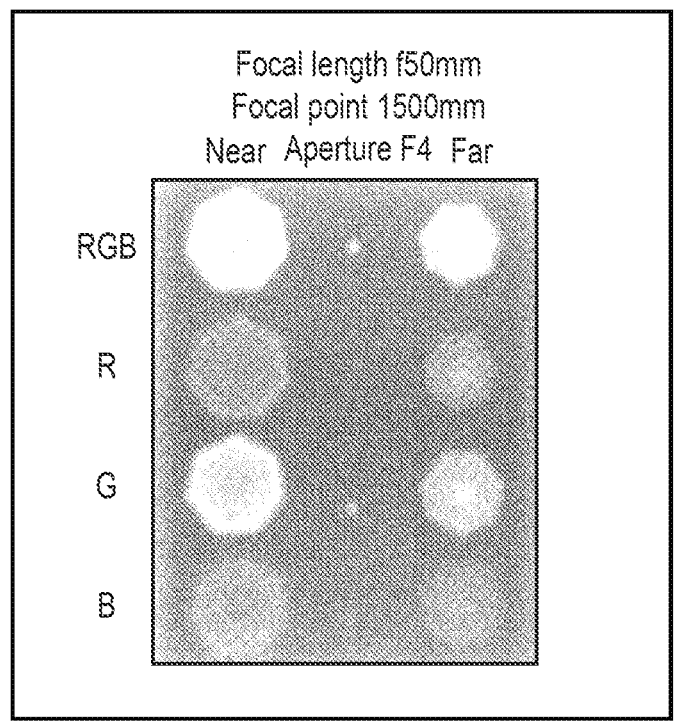
FIG. 12 is a diagram illustrating another exemplary PSF shape that occurs in an image on each channel.

Note that the phenomenon in which the PSF shape varies in accordance with the size of the aperture of the diaphragm mechanism or the position of the subject to the capture device 2 as described above, occurs in each channel (RGB image, R image, G image, and B image), similarly. FIG. 11 separately illustrates a case where the position of the subject is near with respect to the focal point (near side) and a case where the position of the subject is far with respect to the focal point (far side), for the PSF shape that occurs in the image in each channel captured by the capture device 2. In FIG. 11, the capture device 2 includes a lens having a focal length of 50 mm with the focal point and the f-number that are 1500 mm and F1.8. FIG. 12 separately illustrates a case where the position of the subject is near with respect to the focal point and a case where the position of the subject is far with respect to the focal point, for the PSF shape that occurs in the image in each channel captured by the capture device 2. In FIG. 12, the capture device 2 includes a lens having a focal length of 50 mm with the focal point and the f-number that are 1500 mm and F4.

Furthermore, the PSF shape that occurs in the image captured by the capture device 2 varies depending on position in the image.

FIG. 13 separately illustrates, on the upper side thereof, a case where the position of the subject is near with respect to the focal point and a case where the position of the subject is far with respect to the focal point, for the PSF shape that occurs at each position in the image captured by the capture device 2. In the upper side of FIG. 13, the capture device 2 includes a lens having a focal length of 50 mm with the focal point and the f-number that are 1500 mm and F1.8.

FIG. 13 separately illustrates, on the middle side thereof, a case where the position of the subject is near with respect to the focal point and a case where the position of the subject is far with respect to the focal point, for the PSF shape that occurs at each position in the image captured by the capture device 2. In the middle side of FIG. 13, the capture device 2 includes a lens having a focal length of 50 mm with the focal point and the f-number that are 1500 mm and F4.

As illustrated on the upper side and the middle side of FIG. 13, for example, in the vicinity of an end portion of the image captured by the capture device 2 (in particular, the vicinity of the upper-left corner portion), a PSF shape different from the PSF shape located in the vicinity of the center of the image can be observed.

FIG. 13 separately illustrates, on the lower side thereof, a case where the position of the subject is near with respect to the focal point and a case where the position of the subject is far with respect to the focal point, for the PSF shape that occurs at each position in the image captured by the capture device 2. In the lower side of FIG. 13, the capture device 2 includes a lens having a focal length of 105 mm with the focal point and the f-number that are 1500 mm and F4.

FIG. 13 illustrates, on the upper side and the middle side thereof, the PSF shape that occurs in the image captured with the same lens. As illustrated on the lower side of FIG. 13, in the case of use of the lens different in focal length, the PSF shape varied in accordance with the lens is observed (PSF shape different from those on the upper side and the middle side of FIG. 13).

Figure 14:
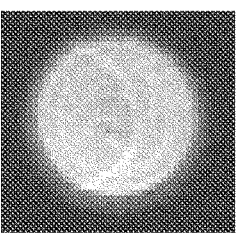
FIG. 14 is a diagram specifically describing the positional dependence of the PSF shape according to each type of lens.

Next, the positional dependence of the PSF shape corresponding to each type of lens (aberration of each lens) for use in the optical system of the capture device 2, will be specifically described with reference to FIG. 14. FIG. 14 illustrates the PSF shapes that occurs in the vicinity of the center of the image (screen center) and in the vicinity of the end portion of the image (screen end) captured with each of a plurality of lenses different in focal length. The PSF shapes are separately illustrated in a case where the position of the subject is near with respect to the focal point and in a case where the position of the subject is far with respect to the focal point.

As illustrated in FIG. 14, the PSF shape that occurs in the vicinity of the center of the image is approximately circular and constant even in a case where types of lenses are different from each other. However, the PSF shape that occurs in the vicinity of the end portion of the image is different in shape from the PSF shape that occurs in the vicinity of the center of the image and varies in characteristic (feature) in accordance with each type of lens. Note that the point that the purple bokeh occurs in the vicinity of the edge of the PSF shape in a case where the position of the subject is near with respect to the focal point and the green bokeh occurs in the vicinity of the edge of the PSF shape in a case where the position of the subject is far with respect to the focal point, described in FIG. 9, is satisfied even in a case where types of lenses are different from each other.

FIG. 14 illustrates two examples regarding a lens having a focal length of 50 mm (#1 and #2). The examples are identical in a focal length of 50 mm but are different in lens manufacturer (namely, different product). The same applies to a lens having a focal length of 85 mm.

Here, in the present embodiment, the distance to the subject 3 is estimated using the statistical model generated by learning of the bokeh that occurs in the image. However, since the PSF shape in the vicinity of the end portion of the image in particular varies greatly depending on each type of lens as described above, the accuracy for the distance to be estimated from the image is likely to deteriorate in a case where the distance is estimated using one statistical model generated without consideration of each type of lens.

Thus, in the present embodiment, the distance to the subject 3 is estimated from the image captured by the capture device 2 by focusing on the bokeh that varies non-linearly in accordance with the distance to the subject 3 included in the above-described target image (namely, the position of the subject 3 with respect to the capture device 2) and using the statistical model generated for each lens for use in the optical system of the capture device 2.

In the present embodiment, examples of the bokeh that varies non-linearly in accordance with the distance to the subject 3 include the bokeh that occurs due to the chromatic aberration of the optical system of the capture device 2 described in FIGS. 8 and 9. Further, the examples of the bokeh include the bokeh that occurs in accordance with the size of the aperture (namely, the f-number) of the diaphragm mechanism that adjusts the quantity of light to be taken in the optical system of the capture device 2 described in FIGS. 10 to 12. Furthermore, the examples of the bokeh include the bokeh that varies in accordance with position in the image captured by the capture device 2 described in FIGS. 13 and 14.

Note that the PSF shape varies depending on the shape of the aperture of the diaphragm mechanism. Here, FIG. 15 illustrates the relationship between the nonlinearity (asymmetry) of the PSF shape and the shape of the aperture of the diaphragm mechanism. The nonlinearity of the PSF shape occurs easily in a case where the shape of the aperture of the diaphragm mechanism is not circular. In particular, the nonlinearity of the PSF shape occurs easily in a case where the shape of the aperture is odd-gonal or in a case where an even-gon is arranged asymmetrically to the horizontal or vertical axis of the image sensor 22.

Here, in FIG. 13 described above, each image indicates the PSF shape depending on the distance to the subject included in the image and position in the image (namely, the bokeh having the distance dependence and the positional dependence). Each image is referred to as an aberration map.

The aberration map is information in a map format indicating the distribution of the bokeh that occurs in the image affected by the aberration of the optical system and depends on the distance to the subject included in the image and position in the image. In other words, the aberration map is information indicating the distance dependence and the positional dependence of the bokeh in the image due to the aberration (namely, the aberration of the optical system).

Note that, in the present embodiment, the aberration map is linked with the statistical model corresponding to the lens that causes the bokeh having the distance dependence and the positional dependence indicated by the aberration map (namely, the statistical model that has learned the bokeh having the distance dependence and the positional dependence). The aberration map is held in the position and attitude estimation device 10 (or the distance estimation module 103) similarly to the statistical model.

Figure 16:
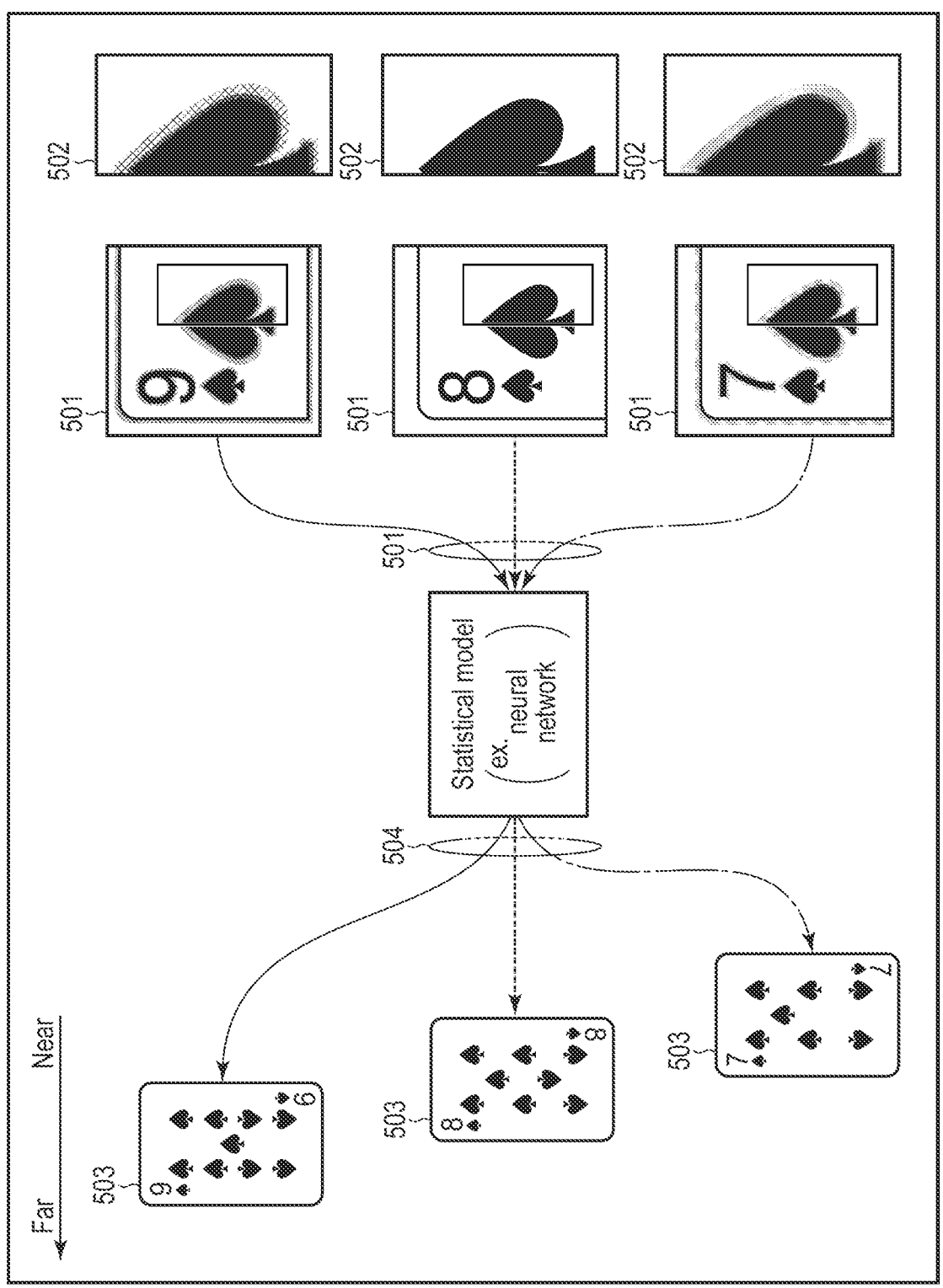
FIG. 16 is a diagram illustrating an outline of an operation of estimating a distance.

FIG. 16 illustrates an outline of an operation of estimating the distance to the subject from the target image in the present embodiment.

Bokeh (bokeh information) 502 that occurs in a target image 501 illustrated in FIG. 16 is a physical clue regarding the distance to a subject 503. Specifically, the color of the bokeh and the size and shape of the PSF are clues regarding the distance to the subject 503.

The distance estimation module 103 estimates a distance 504 to the subject. 503 by analyzing (interpreting) the bokeh 502 that occurs in the target image 501, which is a physical clue, with the statistical model.

An exemplary method of estimating the distance from the target image by the statistical model in the present embodiment, will be described below. Herein, first, second, and third methods will be described.

Figure 17:
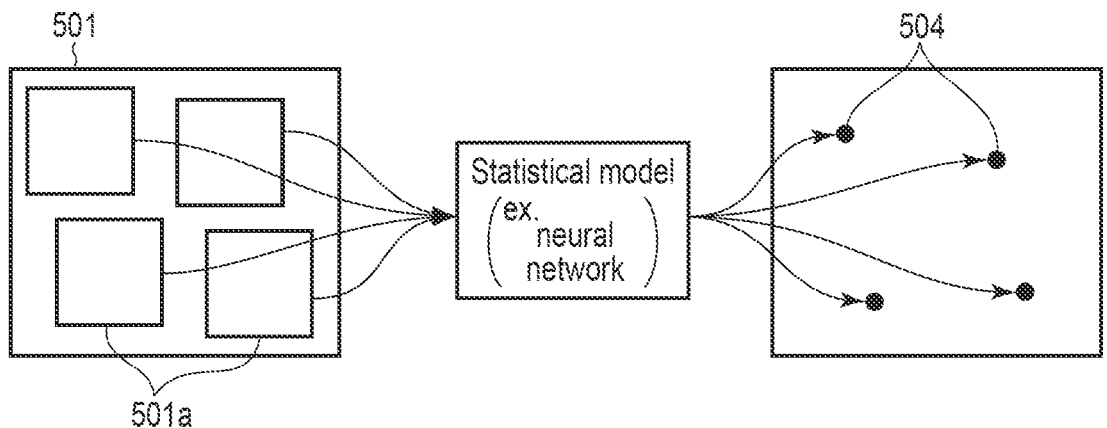
FIG. 17 is a diagram for describing a first method of estimating a distance from a target image.

First, the first method will be described with reference to FIG. 17. In the first method, the distance estimation module 103 extracts a local region (image patch) 501a from the target image 501.

In this case, for example, the entire region of the target image 501 may be divided in a matrix and then each divided partial region may be sequentially extracted as the local region 501a. The local region 501a may be extracted by recognition of the target image 501 such that the region in which the subject (image) is detected is covered. The local region 501a may partially overlap another local region 501a.

Every extracted local region 501a, the distance estimation module 103 inputs information regarding the local region 301a (information regarding the target image 501) into the statistical model, to estimate the distance 504 to the subject in the local region 501a.

The statistical model in which the information regarding the local region 501a is input as above, estimates the distance every pixel of the local region 501a.

Here, for example, in a case where a specific pixel belongs to both of a first local region 501a and a second local region 501a (namely, the pixel is included in the region in which the first local region 501a and the second local region 501a overlap), the distance estimated with the pixel belonging to the first local region 501a and the distance estimated with the pixel belonging to the second local region 501a do not necessarily coincide with each other.

Thus, for example, as described above, in a case where a plurality of local regions 501a partially overlapping has been extracted, the distance based on a pixel in the region in which the plurality of local regions 501a overlaps, may be the average value of, for example, the distance estimated based on the overlapped partial region (pixel) of one local region 501a and the distance estimated based on the overlapped partial region (pixel) of the other local region 501a. In a case where three or more local regions 501a partially overlapping are extracted, the determination may be made by majority voting with the respective distances estimated based on the overlapped partial regions of the three or more local regions 501a.

Figure 18:
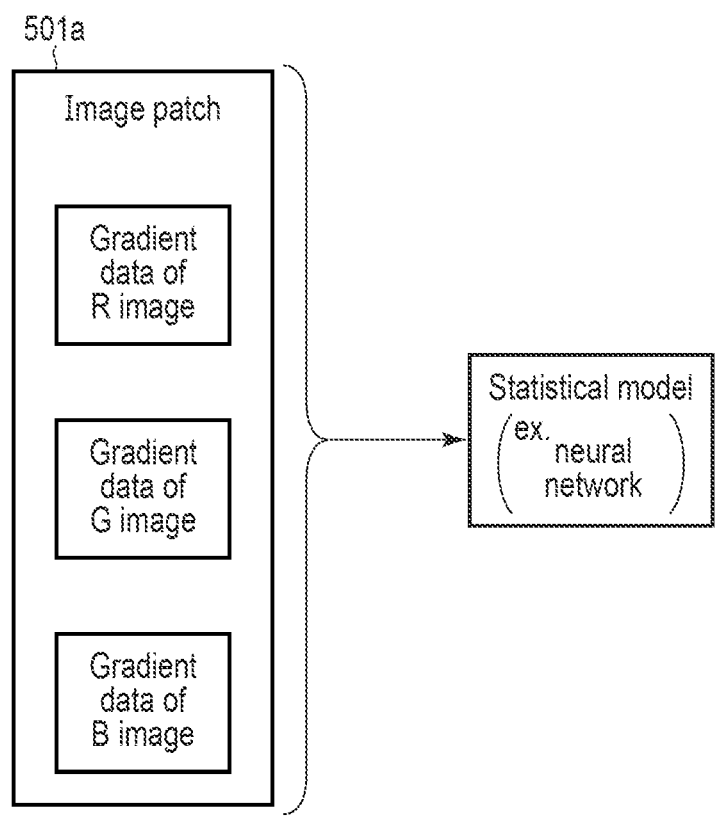
FIG. 18 is a diagram illustrating exemplary information to be input into a statistical model in the first method.

FIG. 18 illustrates exemplary information regarding the local region 501a to be input into the statistical model in the first method.

For each of the R image, the G image, and the image included in the target image 501, the distance estimation module 103 generates gradient data of the local region 501a extracted from the target image 501 (gradient data of the R image, gradient data of the G image, and gradient data of the B image). The gradient data generated by the distance estimation module 103 as above is input into the statistical model.

Note that the gradient data indicates the difference in pixel value (difference value) between each pixel and a pixel adjacent thereto. For example, in a case where the local region 501a is extracted as a rectangular region of n pixels (X-axis direction)×m pixels (Y-axis direction), the gradient data is generated in which the difference value calculated between each pixel in the local region 501a and, for example, the right adjacent pixel thereto is arranged in a matrix of n rows×m columns.

With the gradient data of the R image, the gradient data of the G image, and the gradient data of the B image, the statistical model estimates the distance from the bokeh occurring in each image. FIG. 18 illustrates a case where the gradient data of each of the R image, the G image, and the B image is input into the statistical model. However, the gradient data of the target image 501 (RGB image) may be input into the statistical mode.

Next, the second method will be described with reference to FIG. 19. In the second method, as the information regarding the local region 501a in the first method, the gradient data of each local region (image patch) 501a and positional information regarding the local region 501a in the target image 501 are input into the statistical model.

For example, the positional information 501b may indicate the central point of the local region 501a or may indicate a predetermined side, such as an upper-left side. As the positional information 501b, positional information on the target image 501 regarding each pixel of the local region (image patch) 501a may be used.

Additional input of the positional information 501b into the statistical model as described above, enables estimation of the distance in consideration of the difference between the bokeh of a subject image formed by light passing through the central portion of the lens 21 and the bokeh of a subject image formed by light passing through the end portion of the lens 21.

That is, according to the second method, the distance can be more reliably estimated from the target image 501, based on the correlation between the bokeh, the distance, and the position on the image.

FIG. 20 illustrates exemplary information regarding the local region 501a to be input into the statistical model in the second method.

For example, in a case where a rectangular region of n pixels (X-axis direction)×m pixels (Y-axis direction) is extracted as the local region 501a, the distance estimation module 103 acquires an X-coordinate value (X-coordinate data) on the target image 501 corresponding to, for example, the central point of the local region 501a and a Y-coordinate value (Y-coordinate data) on the target image 501 corresponding to, for example, the central point of the local region 501a.

In the second method, the X-coordinate data and the Y-coordinate data acquired by the distance estimation module 103 as above are input into the statistical model, together with the pieces of gradient data of the R image, the G image, and the B image.

Figure 21:
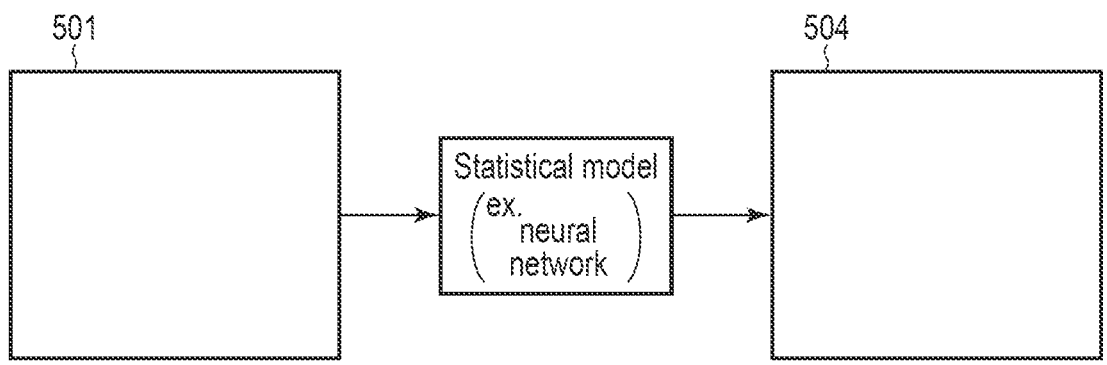
FIG. 21 is a diagram for describing a third method of estimating a distance from a target image.

Furthermore, the third method will be described with reference to FIG. 21. In the third method, no local region (image patch) 501a is extracted from the target image 501, unlike the first method and the second method. In the third method, the distance estimation module 103 inputs information regarding the entire region of the target image 501 (pieces of gradient data of the R image, the G image, and the B image) into the statistical model.

In comparison with the first method and the second method in which the distance 504 is estimated every local region 501a, the third method is likely to increase the uncertainty of estimation of the statistical model but enables reduction of the load of the distance estimation module 103.

In the following description, for convenience, the information to be input into the statistical model in each of the first, second, and third methods is referred to as information regarding the image.

Figure 22:
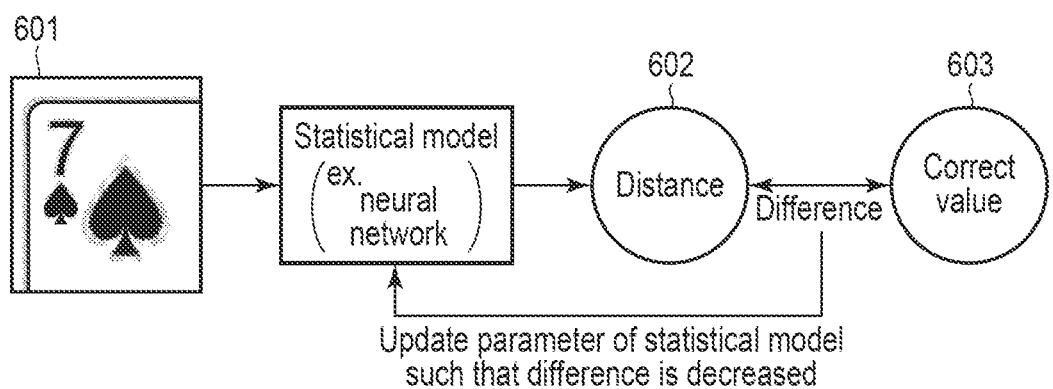
FIG. 22 is a diagram illustrating an exemplary learning method of a statistical model.

FIG. 22 illustrates an exemplary learning method of the statistical model in the present embodiment. Herein, the learning of the statistical model with the image captured by the capture device 2 will be described. However, for example, the learning of the statistical model may be carried out with an image captured by a different device (e.g., a camera) having an optical system similar to the optical system of the capture device 2.

In the following description, an image configured for the statistical model to learn the bokeh that changes non-linearly depending on the distance is referred to as an image for learning for convenience.

Even in a case where any method is used from the first method described with reference to FIG. 17, the second method described with reference to FIG. 19, and the third method described with reference to FIG. 21, the learning of the statistical model is carried out basically as follows. As information regarding an image for learning 601 is input into the statistical model, the difference (error) between a distance 602 estimated by the statistical model and a correct value 603 is fed back to the statistical model. When the difference is fed back, a parameter of the statistical model (e.g., a weight coefficient) is updated such that the difference is decreased.

In a case where the first method is applied as the method of estimating the distance from the target image, even at the time of learning of the statistical model, every local region (image patch) extracted from the image for learning 601, the information regarding the local region (gradient data) is input into the statistical model. According to this, the distance 602 is estimated based on each pixel in each local region by the statistical model. The difference acquired by comparison between the distance 602 estimated as above and the correct value 603, is fed back to the statistical model.

Similarly, in a case where the second method is applied as the method of estimating the distance from the target image, even at the time of learning of the statistical model, every local region (image patch) extracted from the image for learning 601, the gradient data and the positional information as the information regarding the local region are input into the statistical model. According to this, the distance 602 is estimated based on each pixel in each local region by the statistical model. The difference acquired by comparison between the distance 602 estimated as above and the correct value 603, is fed back to the statistical model.

In a case where the third method is applied as the method of estimating the distance from the target image, even at the time of learning of the statistical model, the information regarding the entire region of the image for learning 601 (gradient data) is collectively input into the statistical model. According to this, the distance 602 is estimated based on each pixel in the image for learning 601 by the statistical model. The difference acquired by comparison between the distance 602 estimated as above and the correct value 603, is fed back to the statistical model.

For example, the statistical model in the present embodiment is generated by repeatedly carrying out learning with the image captured while the distance from the capture device 2 to the subject is varied with the focal point fixed. In a case where learning has been completed for one focal point, learning is carried out similarly for another focal point, so that a higher-accuracy statistical model can be generated.

Here, the distance to the subject to be estimated from the image (target image or image for learning) will be specifically described with reference to FIG. 23.

Figure 23:
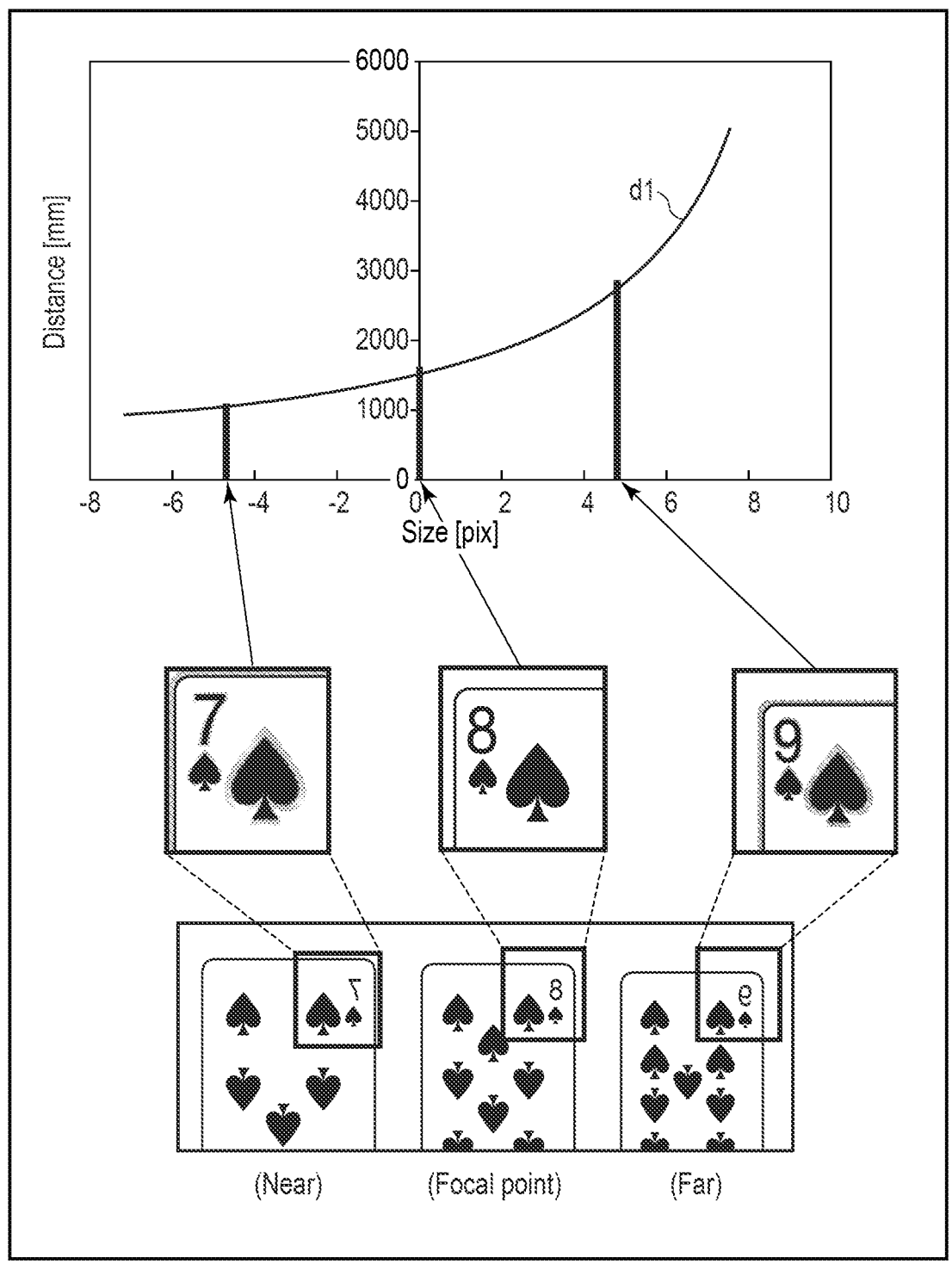
FIG. 23 is a diagram for specifically describing a distance to a subject which is estimated from an image.

In FIG. 23, the size of the bokeh that occurs in a case where the subject is near with respect to the focal point (near side) is indicated negatively in value on the X axis. Further, in FIG. 23, the size of the bokeh that occurs in a case where the subject is far with respect to the focal point (far side) is indicated positively in value on the X axis. That is, in FIG. 23, the color and size of the bokeh are indicated positively and negatively in value.

FIG. 23 illustrates that the absolute value of the size (pixel) of the bokeh increases as the subject moves away from the focal point in both of the case where the position of the subject is near with respect to the focal point and the case where the position of the subject is far with respect to the focal point.

The example illustrated in FIG. 23 assumes that the focal point is approximately 1500 mm in the optical system in which the image is captured. In this case, for example, the bokeh that is approximately −4.8 pixels in size corresponds to a distance of approximately 1000 mm from the optical system. The bokeh that is 0 pixels in size corresponds to a distance of 1500 mm from the optical system. The bokeh that is approximately 4.3 pixels in size corresponds to a distance of approximately 750 mm from the optical system.

Herein, for convenience, the case where the size (pixel) of the bokeh is indicated on the X axis has been described. As described in FIGS. 10 to 14, the shape of the bokeh (PSF shape) that occurs in the image varies between the case where the subject is near with respect to the focal point and the case where the subject is far with respect to the focal point, and varies depending on position in the image. Thus, the value indicated on the X axis in FIG. 23 has in practice taken the shape of the bokeh (PSF shape) into account.

Note that, in a case where the information regarding the image for learning is input into the statistical model at the time of learning of the statistical model, the value indicating the color, size, and shape of the bokeh positively or negatively (hereinafter, referred to as a bokeh value), corresponding to the actual distance to the subject at the time of capturing of the image for learning, is used as the correct value. The statistical model in which such learning is carried out, outputs the bokeh value as the distance to the subject included in the image.

For example, as indicated with a curved line d1 of FIG. 23, because the distance to the subject is in correlation with the color, size, and shape of the bokeh, estimation of the distance and estimation of the color, size, and shape of the bokeh are synonymous.

Note that, in comparison with direct estimation of the distance by the statistical model, estimation of the color, size, and shape of the bokeh by the statistical model enables improvement of the accuracy of estimation of the statistical model. In this case, for example, in a case where, every local region of n pixels (X-axis direction)×m pixels (Y-axis direction), the information regarding the local region is input into the statistical model, the statistical model outputs the distance in which the bokeh value indicating the color, size, and shape of the bokeh estimated based on each pixel of the local region is arranged in a matrix of n rows×m columns.

For the learning of the statistical model, the image for learning including the subject captured at each distance with as small granularity as possible from the lower limit (near side) to the upper limit (far side) of distance acquirable in the distance estimation module 103, is prepared, and the information regarding the prepared image for learning is input into the statistical model. As the correct value for use in the learning of the statistical model, the bokeh value indicating the color, size, and shape of the bokeh corresponding to the distance to the subject at the time of capturing of the image for learning as above, is used. Note that, for the learning of the statistical model, preferably, various images for learning different in subject are prepared.

Next, an example of a processing procedure of a process of generating the statistical model for use in the distance estimation module 103 will be described with reference to a flowchart illustrated in FIG. 24. Note that, for example, the processing illustrated in FIG. 24 may be performed in the position and attitude estimation device 10 or may be performed in a different device.

First, the information regarding an image for learning previously prepared is input into the statistical model (step S21). For example, the image for learning is an image generated by the image sensor 22, based on the light having passed through the lens 21 included in the capture device 2, the image being affected by the aberration of the optical system (lens 21) of the capture device 2. Specifically, the image for learning includes the bokeh that varies non-linearly in accordance with the distance to the subject, described in FIGS. 8 to 14.

Note that the position and attitude estimation device 10 or the different device that performs the processing illustrated in FIG. 24 grasps the information regarding the optical system (e.g., the focal length, the f-number, and the focal point) in which the image for learning is captured, in correlation with the bokeh that occurs in the image for learning.

In a case where the first method is applied as the method of estimating the distance from the target image, as the information regarding the image for learning, every local region of the image for learning, the pieces of gradient data of the R image, the G image, and the B image are input into the statistical model.

In a case where the second method is applied as the method of estimating the distance from the target image, as the information regarding the image for learning, every local region of the image for learning, the pieces of gradient data of the R image, the G image, and the B image together with the positional information regarding the local region on the image for learning are input into the statistical model.

In a case where the third method is applied as the method of estimating the distance from the target image, as the information regarding the image for learning, the pieces of gradient data of the R image, the G image, and the B image for the entire region of the image for learning are input into the statistical model.

Note that, in the present embodiment, the description in which the pieces of gradient data of the R image, the G image, and the B image are input into the statistical model, is given. However, in a case where the distance is estimated from the viewpoint of the shape of the bokeh (PSF shape) that occurs in the image for learning, at least one piece of gradient data of the pieces of gradient data of the R image, the G image, and the B image, needs to be input into the statistical model. Meanwhile, in a case where the distance is estimated from the viewpoint of the color and size of the bokeh that occurs in the image tor learning due to the chromatic aberration, at least two pieces of gradient data of the pieces of gradient data of the R image, the G image, and the B image, need to be input into the statistical model.

After the information regarding the image for learning is input into the statistical model, the distance to the subject is estimated by the statistical model (step S22). In this case, the bokeh occurring in the image for learning is extracted from the image for learning by the statistical model, so that the distance corresponding to the bokeh is estimated.

The distance estimated at step S2 is compared with the correct value acquired at the time of capturing of the image for learning (step S23).

A result of the comparison (difference) at step S23 is fed back to the statistical model (step S24). Thus, a parameter in the statistical model is updated such that the difference is decreased (namely, learning of the bokeh occurring in the image for learning is carried out).

The processing illustrated in FIG. 24 is repeatedly performed every image for learning, resulting in generation of the statistical model having learned (the distance dependence and the positional dependence of) the bokeh that varies non-linearly in accordance with the distance to the subject in the image for learning. The statistical model generated in this manner is held in the position and attitude estimation device 10.

The learning of one statistical model has been described herein. In the present embodiment, the statistical model is prepared every lens for use in the optical system of the capture device 2 as described above. Here, if a first lens or a second lens, for example, is used in the capture device 2 installed in the mobile object 1, the statistical model corresponding to the first lens is generated by repetition of learning with an image (image for learning) captured by the capture device 2 with the first lens. Meanwhile, the statistical model corresponding to the second lens is generated by repetition of learning with an image (image for learning) captured by the capture device 2 with the second lens. The same applies to other lenses. That is, in the present embodiment, for example, repetition of learning with replacement of lenses for use in the optical system of the capture device 2 enables generation of the statistical model corresponding to each of the lenses.

Note that the case where the images captured with replacement of the plurality of lenses are used as the image for learning has been described herein. In the present embodiment, the plurality of aberration maps indicating the distance dependence and the positional dependence corresponding to the focal length, the f-number, and the focus value of each lens is held in the position and attitude estimation device 10. The plurality of aberration maps indicates the distribution of the bokeh that occurs in the image captured with each of the plurality of lenses. Thus, an image (color image) obtained by convolution of an aberration map to a predetermined image is used as the image for learning, and use of the image enables the learning of the statistical model corresponding to each lens. Such a configuration enables reduction of the labor for collection of the image for learning.

Next, an example of a processing procedure of the above-described distance estimation process will be described with reference to a flowchart of FIG. 25. Note that, in the following description, the lens 21 used in the optical system of the capture device 2 that captures a target image (namely, the lens 21 attached to the capture device 2), is referred to as a target lens 21. In the present embodiment, the distance estimation process is performed for each of the target images (time-series images), for example.

First, the distance estimation module 103 estimates the aberration, map (PSE shape) of the target lens 21 from, for example, an image (hereinafter referred to as a sample image) captured by the capture device 2 using the target lens 21 (step S31).

Here, the sample image for use at step S31 is an image acquired by capturing of a test pattern, such as a white-dot image and white-and-black stripes, (test-pattern image). In this case, the distance estimation module 103 extracts the bokeh (PSF shape) occurring at each position in such a sample image, to estimate the aberration map of the target lens 21. The sample image may be held in, for example, a memory provided in the capture device 2, or may be held in the position and attitude estimation device 10 (or the distance estimation module 103).

Note that, at step S31, the aberration map of the entirety of the sample image may be estimated or the aberration map of a partial region of the sample image may be estimated. In the case of estimating the aberration map of a partial region of the sample image, the partial region may be a region in the vicinity of the end portion of the sample image where bokeh having a characteristic shape occurs.

Next, the distance estimation module 103 collates the aberration map of the target lens 21, estimated at step S31, with each of the aberration maps held in the distance estimation module 103 (step S32). At step S32, the distance estimation module 103 calculates the degree of similarity between the aberration map of the target lens 21 and each of the aberration maps held in the distance estimation module 103, and then, specifies an aberration map high in the degree of similarity.

Note that the aberration map is specified as the processing at steps S31 and S32. However, for example, the aberration map may be specified with a first sample image (image including bokeh) affected by the aberration of the optical system (target lens 21) of the capture device 2 and a second sample image (image including no bokeh) having less aberration acquired by reduction of the quantity of light to be taken in the capture device 2 (namely, by reduction of the size of the aperture). Specifically, the degree of similarity between the first sample image (defocused image) and an image generated by convolution of each of the aberration maps held in the distance estimation module 103 to the second sample image may be calculated. According to this, the aberration map used in generation of the image high in the degree of similarity (aberration map convolved in the image) may be specified.

Here, each of the aberration maps held in the position and attitude estimation device 10 is linked with the statistical model as described above. Thus, the distance estimation module 103 selects the statistical model linked with the aberration map specified as described above, from the plurality of statistical models held in the position and attitude estimation device 10 (step S33). The statistical model selected at step S33 corresponds to the statistical model enabling estimation of the distance with high accuracy to the target image captured by the capture device 2 with the target lens 21, and is set as the statistical model corresponding to the target lens 21.

When the processing at step S33 is performed, the distance estimation module 103 inputs the information (gradient data) regarding the target image into the statistical model selected at step S33 (step S34).

When the processing at step S34 is performed, the distance to the subject 3 included in the target image is output from the statistical model. The distance to the subject 3 is output for each of pixels constituting the target image. As a result, the distance estimation module 103 estimates the distance to the subject 3 included in the target image (step S35).

Note that the description has been given assuming that the statistical model is selected using the aberration map held in the position and attitude estimation device 10 in the processing illustrated in FIG. 25. However, in a case where the distance estimation module 103 has grasped the target lens 21, the statistical model corresponding to the target lens 21 may be selected without using the aberration map.

In addition, in a case where the capture device 2 is provided with a memory, lens information regarding the target lens 21 is sometimes held in the memory. The lens information corresponds to a usage value (catalog value) of the target lens 21, and includes the focal length and the f-number of the target lens 21. The lens information may include, for example, the current focal point. In this case, it is also possible to specify the target lens 21 using such lens information and select the statistical model corresponding to the target lens 21.

Furthermore, in some cases, aberration information corresponding to the aberration map of the target lens 21, can be acquired from the manufacturer of the target lens 21 (lens maker). In this case, processing corresponding to that at step S32 may be performed with the aberration information, for selection of the statistical model.

In addition, the user may manually set the focal length, the f-number, and the focal point, and select the statistical model using the set values.

Note that the distance to the subject 3 is estimated for each of the pixels constituting the target image in the distance estimation process (statistical model) according to the present embodiment. However, the distance to the subject 3 may be estimated for each region constituted by, for example, a plurality of pixels.

Further, the description has been given herein assuming that the distance to the subject 3 is estimated using the statistical model. In the distance estimation process in the present embodiment, however, the distance to the subject 3 may be estimated based on a combination of the width and color of the bokeh that occurs by, for example, providing a special color filter in an aperture of the capture device 2, processing a shape of the aperture, or providing a lens customized to obtain arbitrary chromatic aberration. If it is possible to estimate the distance to the subject 3 based on the actual scale, processing other than the distance estimation process described in the present embodiment may be performed.

Next, an example of a processing procedure of the position and attitude correction process (processing at step S4 illustrated in FIG. 4) will be described with reference to a flowchart in FIG. 2E.

As illustrated in FIG. 4, the position and attitude estimation process and the distance estimation process have already been performed in a case where the position and attitude correction process is performed. In the position and attitude estimation process, however, the relative position and attitude of the mobile object 1 are estimated based on the movement of the mobile object 1 from the position and attitude of the mobile object 1 at the time when (the image corresponding to) the first key frame constituting the target images (time-series images) has been captured to the position and attitude of the mobile object 1 at the time when (the image corresponding to) the second key frame has been captured as described in FIG. 5 above. In addition, the distance to the subject 3 included in each of the target images (time-series images) is estimated for each pixel in the distance estimation process.

Hereinafter, the image corresponding to the first key frame of the target image will be referred to as a first image, and the image corresponding to the second key frame of the target image will be referred to as a second image. In addition, the time when the first image has been captured is time t, and the time when the second image has been captured is time t+1.

In this case, the position and attitude correction module 104 generates first and second distance maps based on the distance to the subject 3 included in the first image and the distance to the subject 3 included in the second image estimated in the above-described distance estimation process (step S41).

Note that the first distance map is an image (data) in a map format generated by assigning the distance to the subject 3 to a position of the subject 3 in the first image (arranging a value corresponding to the distance at the position corresponding to a pixel at which the distance has been estimated).

Similarly, the second distance map is an image (data) in a map format generated by assigning the distance to the subject 3 to a position of the subject 3 in the second image (arranging a value corresponding to the distance at the position corresponding to a pixel at which the distance has been estimated).

The first and second distance maps described above can be also generated by a method of normalizing confidence intervals of a histogram of bokeh, used as a physical clue at the time of estimating the distance, so as to be distributed in the range of luminance values (e.g., 0 to 255) and linking the resultant with actual distances corresponding to the minimum and maximum luminance values at the time of calibration. In addition, the first and second distance maps can also be generated by a method based on, for example, a camera design value (theoretical value).

Although the description has been given assuming that the first and second distance maps are generated in the position and attitude correction process in the present embodiment, a plurality of distance maps based on the distance to the subject 3 included in each of the target images may be generated in the distance estimation process.

Next, the position and attitude correction module 104 warps (transforms) one distance map (e.g., the first distance map) between the first and second distance maps generated at step S41 (step S42). Such warping of the first distance map is performed based on, for example, the flow (transform formula) from time t to time t+1 based on the first and second images.

Here, the position and attitude of the mobile object 1 estimated in the position and attitude estimation process are estimated based on the movement of the mobile object 1 from the position and attitude of the mobile object 1 at the time (time t) when the first image (first key frame) has been captured to the position and attitude of the mobile object 1 at the time (time t+1) when the second image (second key frame) has been captured as described above.

Thus, the position and attitude of the mobile object 1 estimated by performing the position and attitude estimation process can be used as the flow between time t and time t+1 to warp the first distance map at step S42 described above.

In this case, at step S42, a distance map (hereinafter referred to as a third distance map) in which the first distance map has been warped is generated by applying the position and attitude of the mobile object 1 to the first distance map.

When a pixel (position) before warping the first distance map is pt and a pixel (position) after warping is ps, ps can be obtained by the following Formula (1).

$$p_s \sim K\hat{T}_{t \to s}\hat{D}_t(p_t)K^{-1}p_t \qquad \text{Formula (1)}$$

The position and attitude of the mobile object 1 estimated in the position and attitude estimation process are represented by the three-dimensional coordinates and rotation, and Tt→s in Formula (1) represents the translation and rotation, and Dt represents the distance assigned to the pixel. In addition, K is a known parameter (camera parameter) set for the capture device 2.

Here, the distance used to generate the first and second distance maps at step S41 described above (that is, the distance estimated by performing the distance estimation process) is based on the actual scale. If the position and attitude of the mobile object 1 estimated by performing the above-described position and attitude estimation process are based on the actual scale, the third distance map in which the first distance map has been warped by applying the position and attitude of the mobile object 1 is equal to the second distance map.

On the other hand, if the position and attitude of the mobile object 1 estimated in the position and attitude estimation process are not based on the actual scale, the third distance map in which the first distance map has been warped by applying the position and attitude of the mobile object 1 is not equal to the second distance map, and it can be said that a residual between the second distance map and the third distance map corresponds to the deviation of the position and attitude of the mobile object 1 from the actual scale.

Thus, the position and attitude correction module 104 compares the second distance map generated at step S41 with the third distance map generated by performing the processing at step S42, and calculates the residual between the second and third distance maps as a result of the comparison (step S43). Since the second and third distance maps are images in which the distance is assigned to each of the pixels, the residual (distance residual) at step S43 is calculated for each of the pixels constituting the second and third distance maps.

Next, the position and attitude correction module 104 corrects the position and attitude of the mobile object 1 estimated in the position and attitude estimation process to the position and attitude of the mobile object 1 based on the actual scale, based on the residual calculated at step S43 (step S44). The correction of the position and attitude of the mobile object 1 at step S44 is performed using an average value of the residuals calculated for the respective pixels at step S43.

Specifically, when the position and attitude of the mobile object 1 based on the actual scale (that is, corrected position and attitude) are expressed as real scale pose (Rt→→t+1, Tt→t+1), this real scale pose (Rt→t+1, Tt→t+1) can be obtained using the following Formula (2).

$$\text{Real Scale Pose}(R_{t \to t+1}, T_{t \to t+1}) = \text{Pose}(R_{t \to t+1}, T_{t \to t+1}) * \frac{P(tz) * \mathit{diff}}{P(tz)^\wedge 2} \quad \text{Formula (2)}$$

In Formula (2), pose (Rt→t+1, Tt→t+1) indicates the position and attitude of the mobile object 1 estimated by performing the position and attitude estimation process (that is, the position and attitude before correction), P(tz) indicates a z component (that is, depth) of the three-dimensional coordinate at the position and attitude of the mobile object 1, and diff indicates the above-described average value of the residuals.

According to this Formula (2), it is possible to express the position and attitude of the mobile object 1 estimated in the position and attitude estimation process on the actual scale.

Although the description has been given herein that Formula (2) is used to express the position and attitude of the mobile object 1 on the actual scale, the position and attitude of the mobile object 1 may be expressed on the actual scale by another method.

Figure 26:
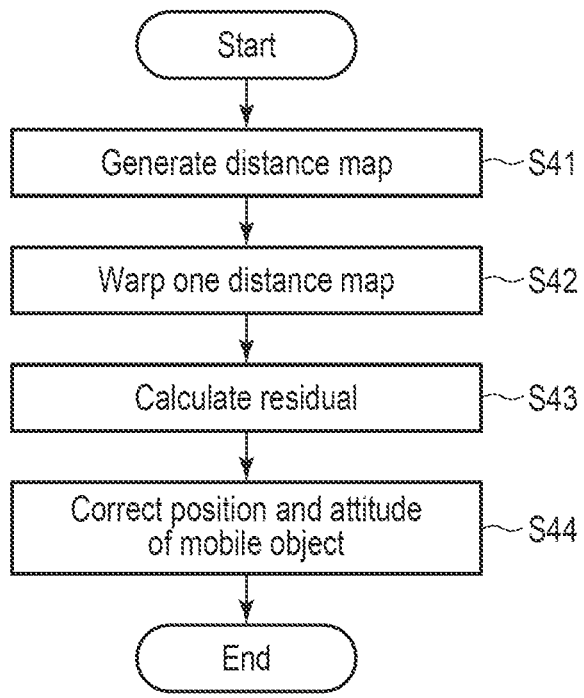
FIG. 26 is a flowchart illustrating an example of a processing procedure of a position and attitude correction process.

In addition, the description has given mainly assuming that the third distance map is generated by warping the first distance map and the third distance map is compared with the second distance map in the position and attitude correction process illustrated in FIG. 26. However, it may be configured such that the third distance map is generated by warping the second distance map, and the third distance map is compared with the first distance map.

Further, the position and attitude of the mobile object 1 estimated by performing the position and attitude estimation process are corrected based on the average value of the residuals calculated for the respective pixels at step S43. However, in a case where there is an outlier (inappropriate value) in the residuals, the outlier can be also excluded by picking up only the residual having the highest frequency in the residual histogram. In addition, such exclusion of the outlier in the residuals may be performed by using, for example, Ransac, which is a robust estimation algorithm. In addition, it is also possible to consider the influence of occlusion at the time of calculating the residual. Specifically, for example, when the capture device 2 is moving forward, the distance from the capture device 2 to the subject 3 is closer at t+1 during time t→t+1. Since there is a case where the distance relationship is reversed due to the occlusion, the present embodiment can be achieved by taking a method that does not include pixels corresponding to such a case in the residual calculation.

As described above, in the present embodiment, the position and attitude estimation process of estimating the position and attitude (first position and attitude) of the mobile object 1 is performed based on the time-series images continuously captured by the capture device 2 installed in the mobile object 1, and the distance estimation process of estimating the distance to the subject 3 (distance based on the actual scale) included in the time-series images is performed. In the present embodiment, the position and attitude of the mobile object 1 estimated by performing the position and attitude estimation process are corrected to the position and attitude (second position and attitude) of the mobile object 1 based on the actual scale, based on the distance estimated by performing the distance estimation process.

In the present embodiment, the time-series images include the first and second images, and a first distance to the subject 3 included in the first image and a second distance to the subject 3 included in the second image are estimated. In addition, the first distance map in which the first distance is assigned to the position of the subject 3 included in the first image and the second distance map in which the second distance is assigned to the position of the subject 3 included in the second image are generated, and the third distance map is generated by applying the position and attitude of the mobile object 1 estimated by performing the position and attitude estimation process to the first distance map. In this case, it is possible to correct the position and attitude of the mobile object 1 estimated by performing the position and attitude estimation process based on the comparison result between the second distance map and the third distance map (that is, the residual of the distance for each pixel between the second distance map and the third distance map).

In the present embodiment, with such a configuration, it is possible to easily obtain (estimate) the position and attitude of the mobile object based on the actual scale even when the monocular camera is used, and the position and attitude of the mobile object can be used to generate the movement path or the like of the mobile object 1.

In the present embodiment, for example, the plurality of feature points is detected from at least two images (the first and second key frames), and the relative position and attitude, calculated by associating the detected feature points between the two images, are estimated as the position and attitude of the mobile object. According to such a configuration, it is possible to estimate the position and attitude of the mobile object 1 on the geometric basis.

In the present embodiment, for example, a deep learning model (second statistical model), which can output relative position and attitude based on the movement of the position and attitude of the mobile object 1 between at least two images in the case of inputting the two images may be prepared in advance to estimate the position and attitude of the mobile object 1 using the deep learning model (that is, estimate the position and attitude of the mobile object 1 based on the deep learning).

Second Embodiment

Figure 27:
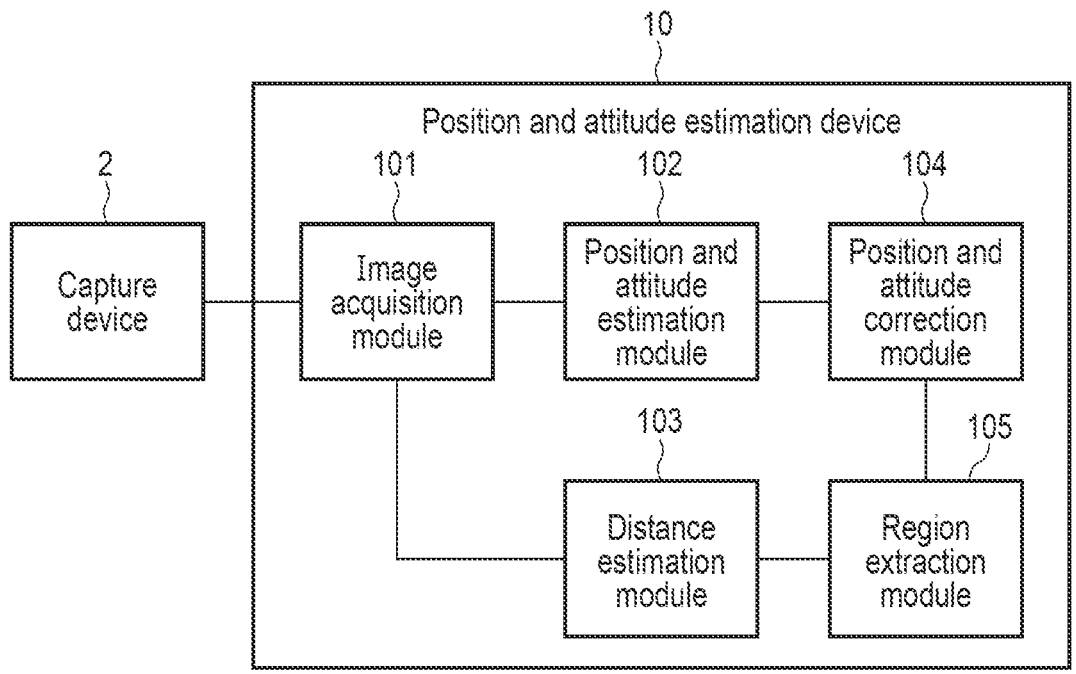
FIG. 27 is a block diagram illustrating an example of a functional configuration of a position and attitude estimation device according to a second embodiment.

Next, a second embodiment will be described. FIG. 27 is a block diagram illustrating an example of a functional configuration of a position and attitude estimation device according to the present embodiment. Note that the same part as that in FIG. 3 described above will be denoted by the same reference sign, and the detailed description thereof will be omitted. Here, the parts different from FIG. 3 will be mainly described.

Note that an outline of a position and an attitude of a mobile object estimated by the position and attitude estimation device according to the present embodiment and a hardware configuration of the position and attitude estimation device are the same as those of the first embodiment described above, and thus, will be described with reference to FIGS. 1 and 2 as appropriate.

As illustrated in FIG. 27, a position and attitude estimation device 10 according to the present embodiment further includes a region extraction module 105 in addition to an image acquisition module 101, a position and attitude estimation module 102, a distance estimation module 103, and a position and attitude correction module 104 described in the first embodiment described above. That is, the position and attitude estimation device 10 according to the present embodiment is different from that of the above-described first embodiment in terms of including the region extraction module 105.

In the present embodiment, a part or whole of the region extraction module 105 included in the position and attitude estimation device 10 is achieved as a CPU 11 (that is, a computer of the position and attitude estimation device 10) performs a position and attitude estimation program 13A, that is, by software, but may be achieved by, for example, hardware, or may be achieved by a combination of software and hardware.

Here, when estimating a distance to a subject 3 included in each of time-series images acquired by the image acquisition module 101 as described in the first embodiment described above, the distance estimation module 103 calculates the reliability for the estimated distance (distance based on an actual scale).

The region extraction module 105 extracts a region where a distance at which the reliability is equal to or higher than a predetermined value has been estimated from each of the time-series images acquired by the image acquisition module 101 (region where the estimated distance based on the actual scale is highly reliable) based on the reliability calculated by the distance estimation module 103.

The position and attitude correction module 104 corrects the position and attitude of the mobile object 1 estimated by the position and attitude estimation module 102 to the position and attitude of the mobile object 1 based on the actual scale, based on (the distance to the subject 3 included in) the region extracted by the region extraction module 105.

Next, an example of a processing procedure of the position and attitude estimation device 10 according to the present embodiment will be described with reference to the flowchart of FIG. 28.

First, the processing at steps S51 to S53 corresponding to the processing at steps S1 to S3 illustrated in FIG. 4 described above is performed.

Here, the distance is estimated for each of pixels constituting the time-series images (target images) acquired at step S1 when the distance estimation process is performed at step S3 illustrated in FIG. 4 described above. In a distance estimation process performed at step S53 illustrated in FIG. 28, however, a distance is estimated for each of pixels constituting the target image, and the reliability (reliability for the distance) is calculated for each of the pixels. The reliability may be an index expressing the validity with respect to the distance, and a method of calculating the reliability is not limited to a specific method. That is, the reliability can be calculated by applying various known methods.

In the distance estimation process, for example, the distance may be estimated for each region constituted by a plurality of pixels. In this case, however, the reliability may also be calculated for each region. In this case, the reliability calculated for each region may be the reliability calculated for a representative pixel among the plurality of pixels constituting the region, or may be a representative value (e.g., an average value) of the reliability calculated for each of the plurality of pixels constituting the region.

The distance estimation process performed at step S53 is the same as the distance estimation process performed at step S3 illustrated in FIG. 4 above except that the reliability is calculated, and thus, the detailed description thereof will be omitted herein.

When the processing at step S53 is performed, the region extraction module 105 extracts a highly reliable region from the target image (each of the time-series images) based on the reliability calculated by performing the distance estimation process at step S53 (step S54). Note that the highly reliable region is, for example, a region including a pixel for which the reliability equal to or higher than a predetermined value (threshold) has been calculated. Specifically, the highly reliable region can be extracted by setting a Boolean value for, for example, a pixel whose reliability is lower than the threshold among a plurality of pixels constituting the target image to zero and separating a region where the Boolean value is zero from the target image as a mask region.

Next, the position and attitude correction module 104 performs a position and attitude correction process (step S55). In this position and attitude correction process, the position and attitude of the mobile object 1 estimated by performing the position and attitude estimation process at step S52 are corrected to the position and attitude of the mobile object 1 based on the actual scale (that is, expressed on the actual scale), based on (distances estimated for the pixels constituting) the highly reliable region extracted at step S54.

Specifically, in the position and attitude correction process (processing illustrated in FIG. 26) in the first embodiment described above, the third distance map generated by warping the first distance map is compared with the second distance map to calculate the residuals for all the pixels constituting the second and third distance maps. In the present embodiment, however, a residual is not calculated for distances estimated for a plurality of pixels constituting a region (mask region) other than the high reliability region extracted from the first image at step S54 and a plurality of pixels constituting a region (mask region) other than the highly reliable region extracted from the second image among the pixels constituting the second and third distance maps, Note that the position and attitude correction process performed at step S55 is the same as that at step S4 (processing illustrated in FIG. 26) illustrated in FIG. 4 described above except for the points described here, the detailed description thereof will be omitted herein.

As described above, in the present embodiment, the reliability of each of the distances estimated for each of the pixels is calculated when the distance is estimated for each of the pixels (regions) constituting the first and second images included in the target images, and the region for which the distance at which the reliability is equal to or higher than the predetermined value has been estimated is extracted from each of the first and second images. In the present embodiment, the position and attitude (relative position and attitude) of the mobile object 1 estimated in the position and attitude estimation process are corrected to the position and attitude based on the actual scale, based on the region thus extracted from the first and second images.

In the present embodiment, the position and attitude of the mobile object 1 are corrected based on the highly reliable distance as described above, and thus, it is possible to obtain the position and attitude of the mobile object 1 with higher accuracy based on the actual scale.

Third Embodiment

Figure 29:
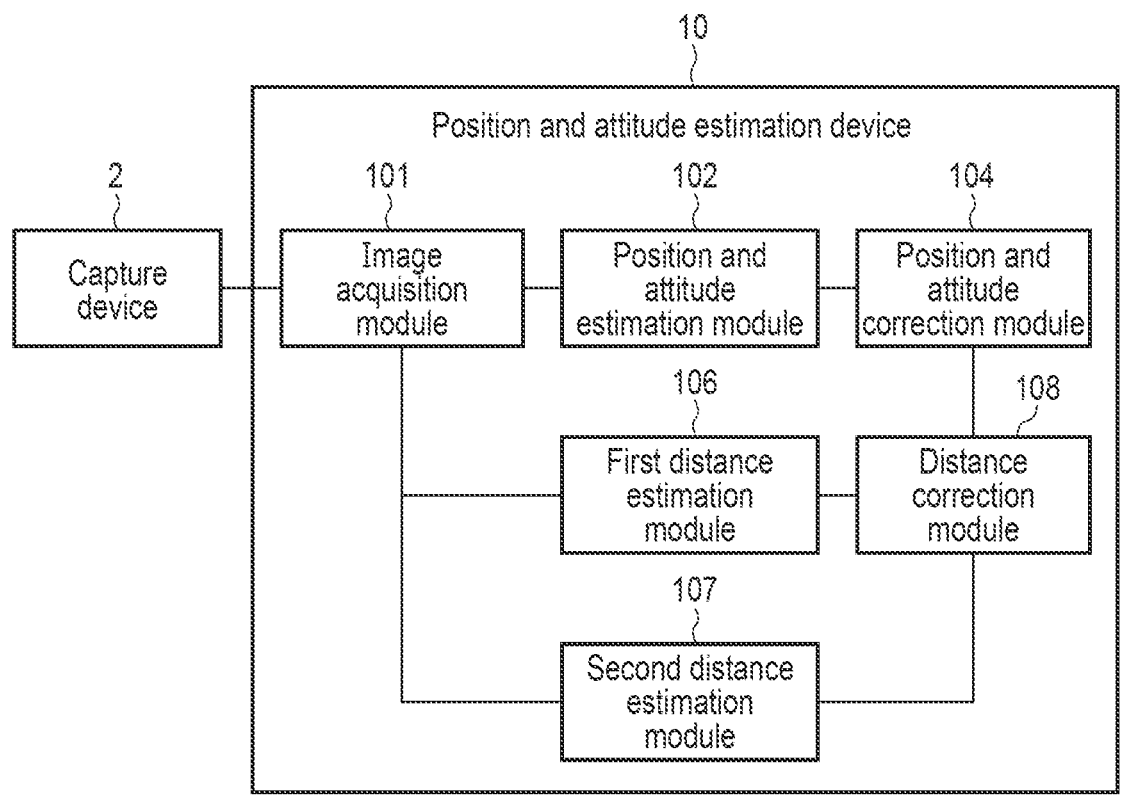
FIG. 29 is a block diagram illustrating an example of a functional configuration of a position and attitude estimation device according to a third embodiment.

Next, a third embodiment will be described. FIG. 29 is a block diagram illustrating an example of a functional configuration of a position and attitude estimation device according to the present embodiment. Note that the same part as that in FIG. 3 described above will be denoted by the same reference sign, and the detailed description thereof will be omitted. Here, the parts different from FIG. 3 will be mainly described.

Note that an outline of a position and an attitude of a mobile object estimated by the position and attitude estimation device according to the present embodiment and a hardware configuration of the position and attitude estimation device are the same as those of the first embodiment described above, and thus, will be described with reference to FIGS. 1 and 2 as appropriate.

As illustrated in FIG. 29, a position and attitude estimation device 10 according to the present embodiment further includes a first distance estimation module 106, a second distance estimation module 107, and a distance correction module 108 in addition to an image acquisition module 101, a position and attitude estimation module 102, and a position and attitude correction module 104 described in the first embodiment described above. That is, the position and attitude estimation device 10 according to the present embodiment is different from that of the above-described first embodiment in terms of including the first distance estimation module 106, the second distance estimation module 107, and the distance correction module 108.

In the present embodiment, some or all of the first distance estimation module 106, the second distance estimation module 107, and the distance correction module 108 included in the position and attitude estimation device 10 is achieved as a CPU 11 (that is, a computer of the position and attitude estimation device 10) performs a position and attitude estimation program 13A, that is, by software, but may be achieved by, for example, hardware, or may be achieved by a combination of software and hardware.

The first distance estimation module 106 estimates a distance to a subject 3 included in each of time-series images acquired by the image acquisition module 101. Note that the distance to the subject 3 estimated by the distance estimation module 103 is a distance based on an actual scale.

The second distance estimation module 107 estimates the distance to the subject 3 included in each of the time-series images acquired by the image acquisition module 101. Note that the distance to the subject 3 estimated by the distance estimation module 103 is a distance with an indefinite scale (hereinafter, referred to as the distance with the indefinite scale). In the present embodiment, the distance with the indefinite scale means that a unit (scale) of the distance is not defined, and does not refer to the distance based on the unit used in the real space described above (distance based on the actual scale).

In the present embodiment, the first distance estimation module 106 is a functional module corresponding to the distance estimation module 103 in the first embodiment described above, and estimates the distance to the subject 3 by the same method as that of the distance estimation module 103 described in the first embodiment described above. On the other hand, the second distance estimation module 107 estimates the distance to the subject 3 by a method different from that of the first distance estimation module 106.

The distance correction module 108 corrects the distance (distance with the indefinite scale) estimated by the second distance estimation module 107 (to be expressed on the actual scale) using the distance (distance based on the actual scale) estimated by the first distance estimation module 106.

Next, an example of a processing procedure of the position and attitude estimation device 10 according to the present embodiment will be described with reference to the flowchart of FIG. 30.

First, the processing at steps S61 and S62 corresponding to the processing at steps S1 and S2 illustrated in FIG. 4 described above is performed.

When the processing at step S61 is performed, the first distance estimation module 106 performs a process of estimating a distance to the subject 3 included in the target image (each of the time-series images) (hereinafter, referred to as a first distance estimation process) (step S63). Since the first distance estimation process performed at step S63 is the same as the distance estimation process described in the first embodiment described above, the detailed description thereof will be omitted herein.

When the processing at step S61 is performed, the second distance estimation module 107 performs a process of estimating a distance to the subject 3 included in the target image (each of the time-series images) (hereinafter, referred to as a second distance estimation process) (step S64).

Note that this second distance estimation process may be a process of estimating the distance to the subject 3 (distance with the indefinite scale) by a method different from that of the first distance estimation process described above. In the second distance estimation process, the distance is estimated for each pixel as in the first distance estimation process. However, when the distance is estimated for each of regions constituted by a plurality of pixels in the first distance estimation process, for example, the distance may be also estimated for each of the regions in the second distance estimation process. That, is, the second distance estimation process may be able to estimate the distance to the subject included in the target image with the same density as that in the first distance estimation process.

Specifically, in the second distance estimation process, for example, a deep learning-based estimation method capable of estimating a distance from one image using context information of the target image (a feature value regarding a line segment, color distribution, or the like in the target image, a shape of the subject, and the like) as a clue for the distance may be adopted.

In addition, in the second distance estimation process, for example, a deep learning-based estimation method capable of estimating a distance from two consecutive images using an optical flow between the two images included in the target image (visual flow of the subject caused by the movement of the mobile object 1) as a clue for the distance may be adopted.

That is, in the present embodiment, a configuration can be adopted in which a deep learning model, which outputs the distance with the indefinite scale by inputting at least one image of the target images (time-series images), is used to estimate the distance to the subject 3 included in the target image. Note that such a deep learning model may be constructed so as to output the distance to the subject 3 in the format of a distance map (that is, the map format).

In addition, an estimation method other than those described herein may be adopted in the second distance estimation process.

Here, the distance, estimated by performing the above-described first distance estimation process (distance estimation process described in the above-described first embodiment), is the distance based on the actual scale with relatively high accuracy, but some of the distances estimated for the respective pixels include a distance with low accuracy (that is, not ail distances estimated for the respective pixels are distances exactly based on the actual scale).

Thus, the distance correction module 108 corrects the distance estimated for each of the pixels by performing the processing at step S64 (the second distance estimation process) using the distance estimated for each of the pixels estimated by performing the processing at step S63 (the first distance estimation process) (step S65). In this step S65, it is possible to obtain the distance expressed on the actual scale by calculating (optimizing) a scale value so as to make the distance estimated for each of the pixels (distance with the indefinite scale) by performing the second distance estimation process approximate to the distance estimated for each of the pixels (distance based on the actual scale) by performing the first distance estimation process, and applying the scale value to the distance estimated by performing the second distance estimation process.

When the processing at step S65 is performed, the processing at step S66 corresponding to the processing at step S4 illustrated in FIG. 4 is performed.

Note that the position and attitude estimation process at step S62, the first distance estimation process at step S63 and the second distance estimation process at step S64 in the processing illustrated in FIG. 30 described above can be performed independently (or in parallel).

As described above, in the present embodiment, it is possible to correct the position and attitude of the mobile object 1 based on the distance based on the actual scale with higher accuracy with the configuration in which the distance with the indefinite scale estimated by performing the second distance estimation process (distance with the indefinite scale) is corrected based on the distance based on the actual scale estimated by performing the first distance estimation process. Thus, it is possible to obtain the position and attitude of the mobile object 1 with higher accuracy based on the actual scale.

In addition, the above-described second embodiment may be applied to the present embodiment. In this case, a configuration can be adopted in which the distance estimated by the second distance estimation module 107 is corrected based on the distance at which the reliability is equal to or higher than the predetermined value among the distances based on the actual scale estimated for the respective pixels by the first distance estimation module 106. In the case of such a configuration, a scale value for making the distance with the indefinite scale approximate to the distance based on the actual scale may be calculated based on a distance based on the actual scale (first distance) at which reliability is equal to or higher than the predetermined value, and the distance with the indefinite scale (second distance) estimated for the pixel (region) where the distance has been estimated. If the scale value calculated in this manner is applied to all the distances estimated for the respective pixels by the second distance estimation module 107, it is also possible to correct the distances with the indefinite scale estimated for the pixels constituting the mask region (region other than the highly reliable region).

Figure 28:
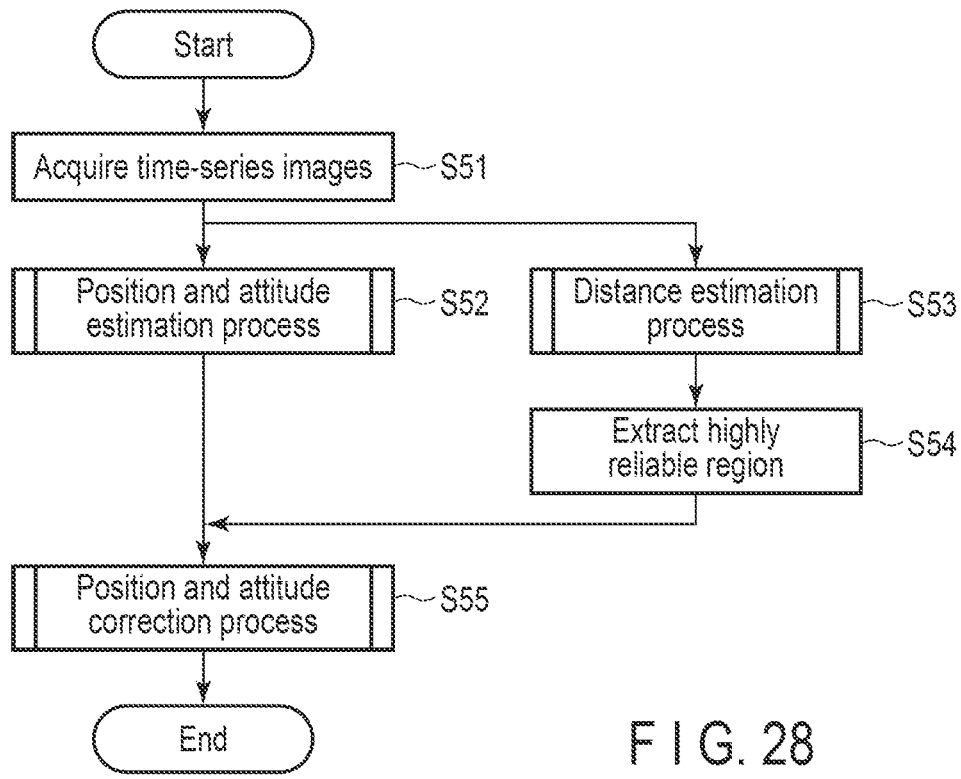
FIG. 28 is a flowchart illustrating an example of a processing procedure of the position and attitude estimation device.

In the case where the above-described second embodiment is applied to the present embodiment, the processing at step S55 illustrated in FIG. 28 may be performed instead of the processing at step S66 illustrated in FIG. 30. According to this, it is possible to obtain the position and attitude of the mobile object 1 with higher accuracy.

Note that the description has been given assuming that the distance with the indefinite scale is estimated by performing the second distance estimation process in the present embodiment. However, the distance estimated by performing the second distance estimation process may be a distance based on the actual scale if it is possible to acquire the distances based on the actual scale with higher accuracy with which the distance estimated by performing the above-described first distance estimation process and the distance estimated by performing the second distance estimation process complement each other. That is, the distance estimated by performing the second distance estimation process may have different characteristics (properties) from the distance estimated by performing the first distance estimation process.

According to at least one of the embodiments described above, the position and attitude estimation device, the position and attitude estimation method, and the program capable of easily estimating the position and attitude of the mobile object based on the actual scale are provided.

While certain embodiments have been described, these embodiments have been presented by way of example only, and are net intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position and attitude estimation device comprising:
a processor configured to:
    acquire time-series images continuously captured by a capture device installed on a mobile object;
    estimate first position and attitude of the mobile object based on the acquired time-series images;
    estimate a distance based on an actual scale to a subject included in the acquired time-series images;
    estimate a distance with an indefinite scale to a subject included in the acquired time-series images;
    correct the estimated distance with the indefinite scale based on the estimated distance based on the actual scale; and
    correct the estimated first position and attitude to a second position and attitude based on an actual scale, based on the corrected distance.

2. The position and attitude estimation device according to claim 1, wherein
the acquired time-series images comprises first and second images, and
the processor is configured to:
    estimate a first distance to the subject included in the first image and a second distance to the subject included in the second image;
    generate a first distance map in which the first distance is assigned to a position of the subject included in the first image and a second distance map in which the second distance is assigned to a position of the subject included in the second image;

generate a third distance map by applying the first position and attitude of the mobile object to the first distance map; and correct the first position and attitude to the second position and attitude based on a comparison result between the second distance map and the third distance map.

3. The position and attitude estimation device according to claim 2, wherein the processor is configured to:

estimate each of distances for each of regions constituting the first and second images and calculate reliability of each of the distances estimated for the respective regions;

extract regions for which a distance at which the reliability is equal to or higher than a predetermined value has been estimated from the first and second images, respectively; and correct the first position and attitude to the second position and attitude based on the regions extracted from the first and second images.

4. The position and attitude estimation device according to claim 3, wherein the processor is configured to correct the estimated distance with the indefinite scale based on a distance at which the reliability is equal to or higher than a predetermined value among the distances based on the actual scale estimated for the respective regions.

5. The position and attitude estimation device according to claim 4, wherein the processor is configured to:

estimate a distance with an indefinite scale for each of regions constituting the first and second images; and calculate a scale value to make a second distance approximate to a first distance based on the first distance at which the reliability is equal to or higher than a predetermined value among the distances based on the actual scale estimated for the respective regions and the second distance with an indefinite scale estimated for the region where the first distance has been estimated, and correct the distance with the indefinite scale estimated for each of the regions based on the calculated scale value.

6. The position and attitude estimation device according to claim 1, wherein the processor is configured to use a first statistical model that outputs a distance with an indefinite scale by inputting at least one image among the acquired time-series images to estimate a distance with an indefinite scale to a subject included in the image.

7. The position and attitude estimation device according to claim 1, wherein the acquired time-series images comprises at least two images, and the processor is configured to detect a plurality of feature points from each of the at least two images, and estimates relative position and attitude, calculated by associating the detected feature points between the two images, as the first position and attitude.

8. The position and attitude estimation device according to claim 1, wherein the acquired time-series images comprises at least two images, and the processor is configured to estimate the first position and attitude using a second statistical model that outputs relative position and attitude when the at least two images are input.

9. A position and attitude estimation method comprising:

acquiring time-series images continuously captured by a capture device installed on a mobile object;

estimating first position and attitude of the mobile object based on the acquired time-series images;

estimating a distance based on an actual scale to a subject included in the acquired time-series images;

estimating a distance with an indefinite scale to a subject included in the acquired time-series images;

correcting the estimated distance with the indefinite scale based on the estimated distance based on the actual scale; and correcting the estimated first position and attitude to a second position and attitude based on an actual scale, based on the corrected distance.

10. The position and attitude estimation method according to claim 9, wherein the acquired time-series images include first and second images, the estimating the distance comprises estimating a first distance to the subject included in the first image and a second distance to the subject included in the second image, and the correcting comprises:

generating a first distance map in which the first distance is assigned to a position of the subject included in the first image and a second distance map in which the second distance is assigned to a position of the subject included in the second image;

generating a third distance map by applying the first position and attitude of the mobile object to the first distance map; and correcting the first position and attitude to the second position and attitude based on a comparison result between the second distance map and the third distance map.

11. The position and attitude estimation method according to claim 10, further comprising:

estimating each of distances for each of regions constituting the first and second images;

calculating reliability of each of the distances estimated for the respective regions, extracting regions for which a distance at which the reliability is equal to or higher than a predetermined value has been estimated from the first and second images, respectively, and wherein the correcting comprises correcting the first position and attitude to the second position and attitude based on the regions extracted from the first and second images.

12. The position and attitude estimation method according to claim 11, wherein the correcting the distance comprises correcting the estimated distance with the indefinite scale based on a distance at which the reliability is equal to or higher than a predetermined value among the distances based on the actual scale estimated for the respective regions.

13. The position and attitude estimation method according to claim 12, wherein the estimating the distance with the indefinite scale comprises estimating a distance with an indefinite scale for each of regions constituting the first and second images, the correcting the distance comprises calculating a scale value to make a second distance approximate to a first distance based on the first distance at which the reliability is equal to or higher than a predetermined value among the distances based on the actual scale estimated for the respective regions and the second distance with an indefinite scale estimated for the region where the first distance has been estimated, and correcting the distance with the indefinite scale estimated for each of the regions based on the calculated scale value.

14. The position and attitude estimation method according to claim 9, wherein the estimating the distance with the indefinite scale comprises estimating distance with an indefinite scale to a subject included in at least one image among the acquired time-series images using a first statistical model that outputs a distance with an indefinite scale by inputting the image.

15. The position and attitude estimation method according to claim 9, wherein
the acquired time-series images comprise at least two images, and
the estimating the first position and attitude comprises detecting a plurality of feature points from each of the at least two images, and estimating relative position and attitude, calculated by associating the detected feature points between the two images, as the first position and attitude.

16. The position and attitude estimation method according to claim 9, wherein
the acquired time-series images comprise at least two images, and
the estimating the first position and attitude comprises estimating the first position and attitude using a second statistical model that outputs relative position and attitude when the at least two images are input.

17. A non-transitory computer-readable storage medium having stored thereon a computer program which is executable by a computer, the computer program comprising instructions capable of causing the computer to execute functions of:
acquiring time-series images continuously captured by a capture device installed on a mobile object;
estimating first position and attitude of the mobile object based on the acquired time-series images;
estimating a distance based on an actual scale to a subject included in the acquired time-series images;
estimating a distance with an indefinite scale to a subject included in the acquired time-series images;
correcting the estimated distance with the indefinite scale based on the estimated distance based on the actual scale; and
correcting the estimated first position and attitude to a second position and attitude based on an actual scale, based on the corrected distance.

* * * * *